(12) United States Patent
Narita

(10) Patent No.: US 11,999,051 B2
(45) Date of Patent: Jun. 4, 2024

(54) CONTROL DEVICE, CONTROL METHOD, AND PROGRAM

(71) Applicant: SONY CORPORATION, Tokyo (JP)

(72) Inventor: Tetsuya Narita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 174 days.

(21) Appl. No.: 16/982,204

(22) PCT Filed: Jan. 22, 2019

(86) PCT No.: PCT/JP2019/001901
§ 371 (c)(1),
(2) Date: Sep. 18, 2020

(87) PCT Pub. No.: WO2019/187546
PCT Pub. Date: Oct. 3, 2019

(65) Prior Publication Data
US 2021/0031377 A1    Feb. 4, 2021

(30) Foreign Application Priority Data

Mar. 27, 2018  (JP) ................................. 2018-059544

(51) Int. Cl.
*B25J 13/08*   (2006.01)
*B25J 9/16*    (2006.01)

(52) U.S. Cl.
CPC .......... *B25J 13/082* (2013.01); *B25J 9/1612* (2013.01); *B25J 13/084* (2013.01)

(58) Field of Classification Search
CPC ...... B25J 13/083; B25J 9/1612; B25J 13/085; B25J 13/084; B25J 13/082; B25J 13/08; B25J 9/161; B25J 19/02
See application file for complete search history.

(56) References Cited

U.S. PATENT DOCUMENTS

| 7,407,208 B2 * | 8/2008 | Tadano | ................. B25J 9/1075 294/111 |
| 7,591,166 B2 * | 9/2009 | Ueda | ..................... B25J 13/084 73/9 |
| 8,498,745 B2 * | 7/2013 | Umetsu | .................... B25J 5/007 700/254 |

(Continued)

FOREIGN PATENT DOCUMENTS

| JP | H06-126684 A | 5/1994 |
| JP | 2006-047145 A | 2/2006 |

(Continued)

*Primary Examiner* — Khoi H Tran
*Assistant Examiner* — Trang Dang
(74) *Attorney, Agent, or Firm* — Paratus Law Group, PLLC

(57) ABSTRACT

There is provided a control device, a control method, and a program which are able to appropriately control a grip force of when a contact section and an object come into contact with each other. The control device includes a grip controller that controls a grip force related to a contact section depending on a contact force of when the contact section and an object come into contact with each other, the contact force being based on a sensing result obtained by a tactile sensor disposed at the contact section and a sensing result obtained by a force sensor disposed at the contact section.

21 Claims, 12 Drawing Sheets

(56) References Cited

U.S. PATENT DOCUMENTS

| | | | |
|---|---|---|---|
| 8,644,986 B2* | 2/2014 | Tsuboi | B25J 9/1612 |
| | | | 414/6 |
| 9,127,999 B2* | 9/2015 | Tsuruno | B25J 19/026 |
| 9,855,663 B1* | 1/2018 | Strauss | B25J 15/0408 |
| 10,272,568 B2* | 4/2019 | Tsuzaki | B25J 9/1633 |
| 10,481,747 B2* | 11/2019 | Rosenberg | G06F 3/045 |
| 10,850,392 B2* | 12/2020 | Hager | B25J 15/0009 |
| 2016/0136822 A1 | 5/2016 | Chang et al. | |

FOREIGN PATENT DOCUMENTS

| | | |
|---|---|---|
| JP | 2007-152528 A | 6/2007 |
| JP | 2009-034743 A | 2/2009 |
| JP | 2009-066683 A | 4/2009 |
| JP | 2009-066714 A | 4/2009 |
| KR | 101294250 B1 | 8/2013 |

\* cited by examiner

[ FIG. 1 ]
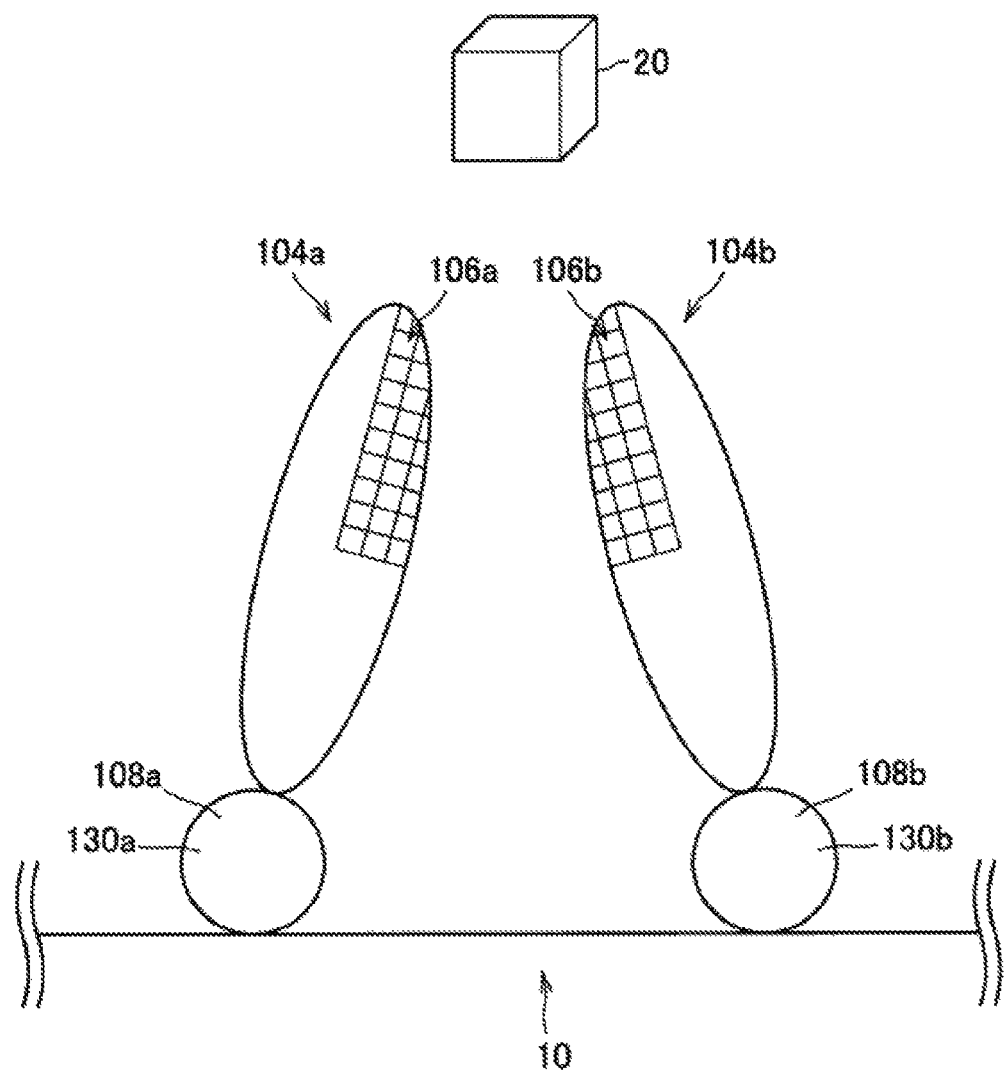

[FIG. 2]
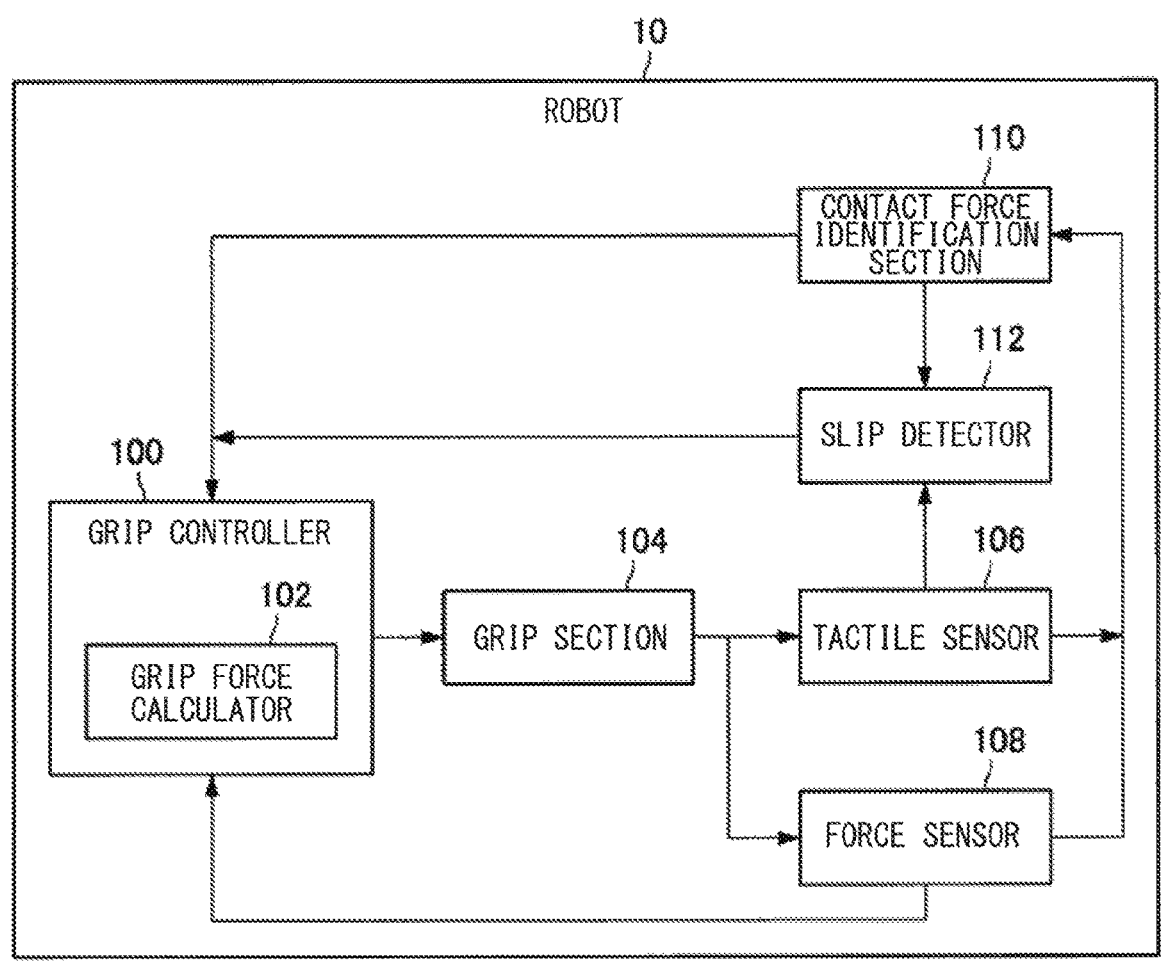

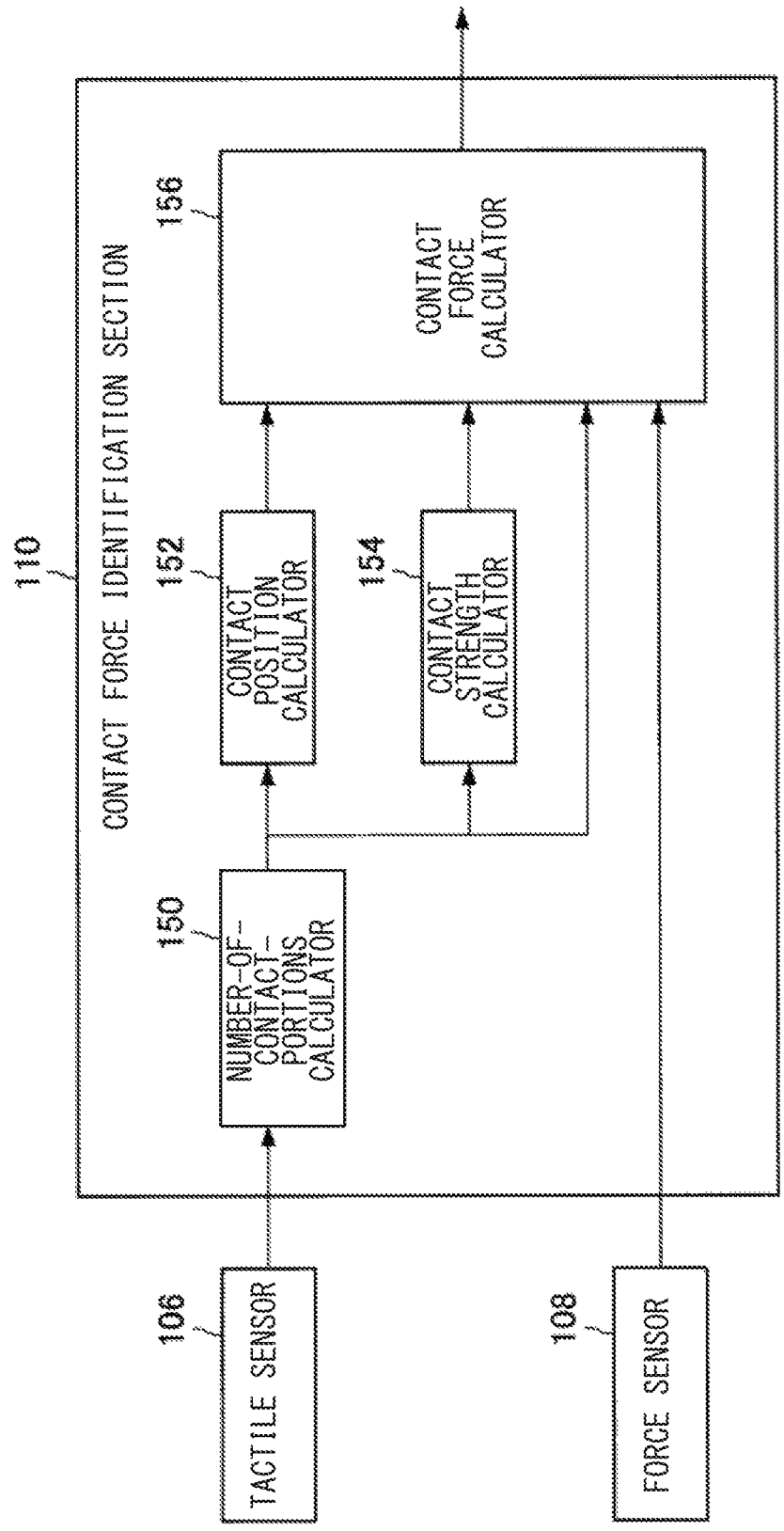
[FIG. 3]

[ FIG. 4 ]
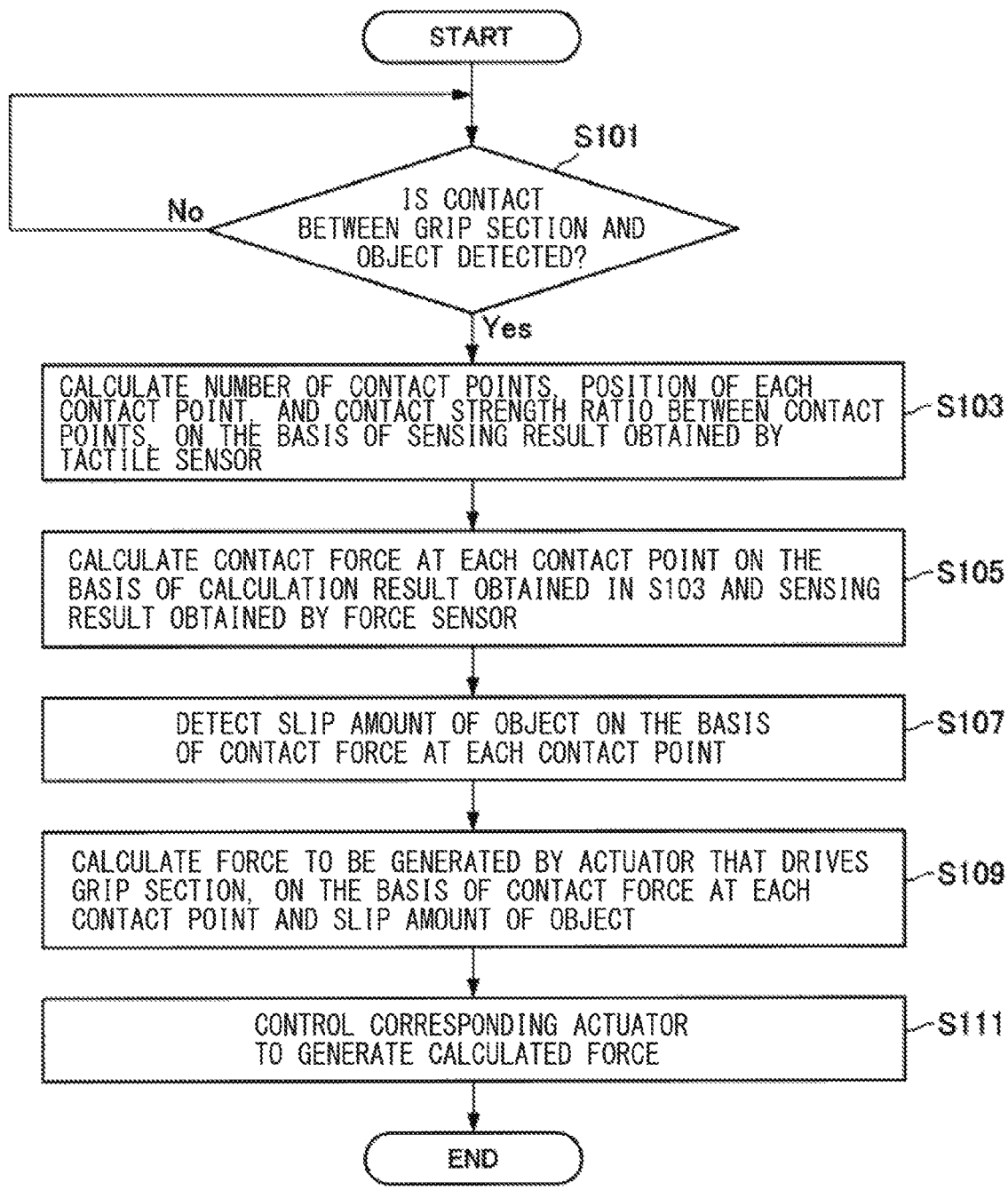

[FIG. 5]
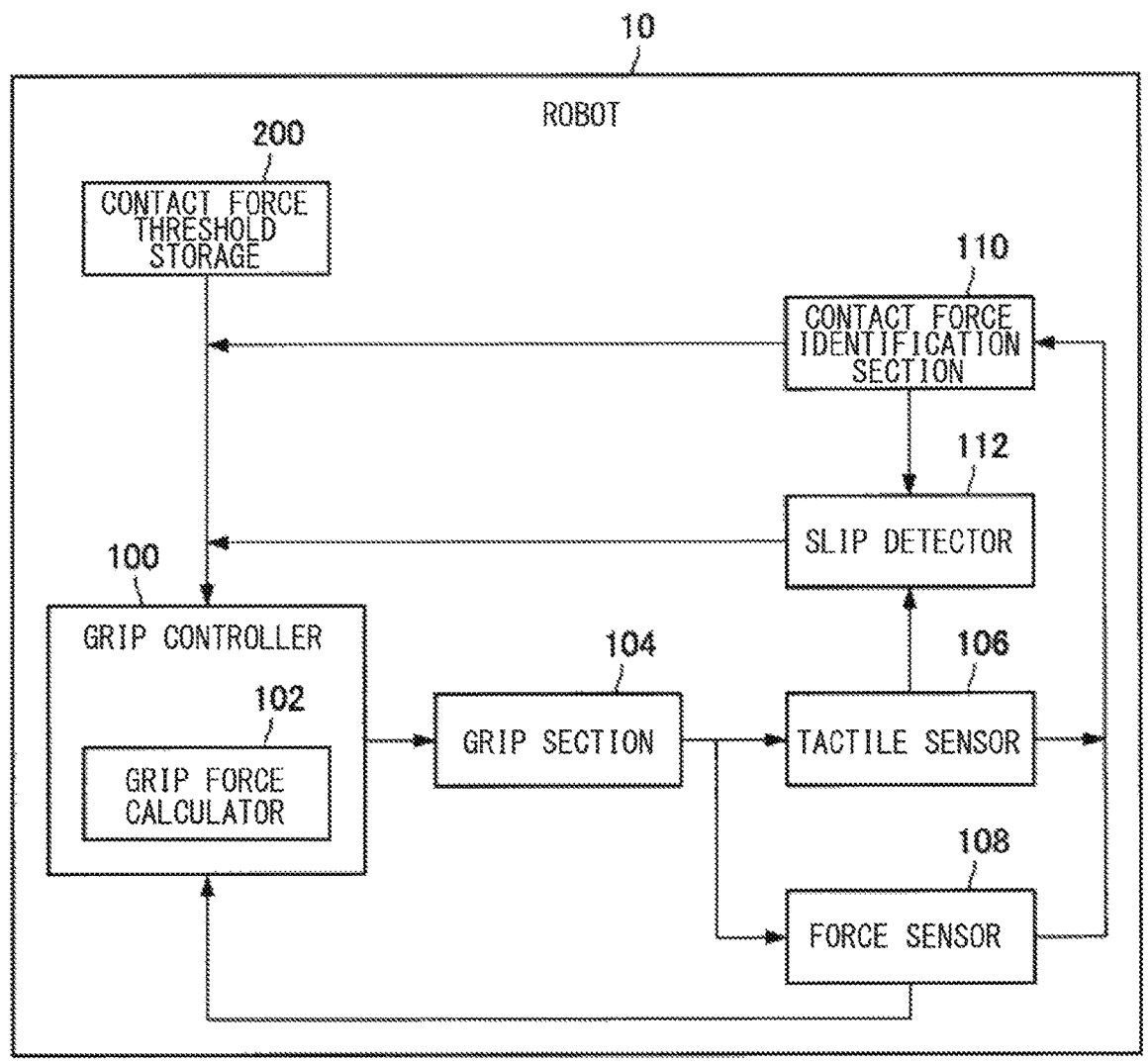

[FIG. 6]
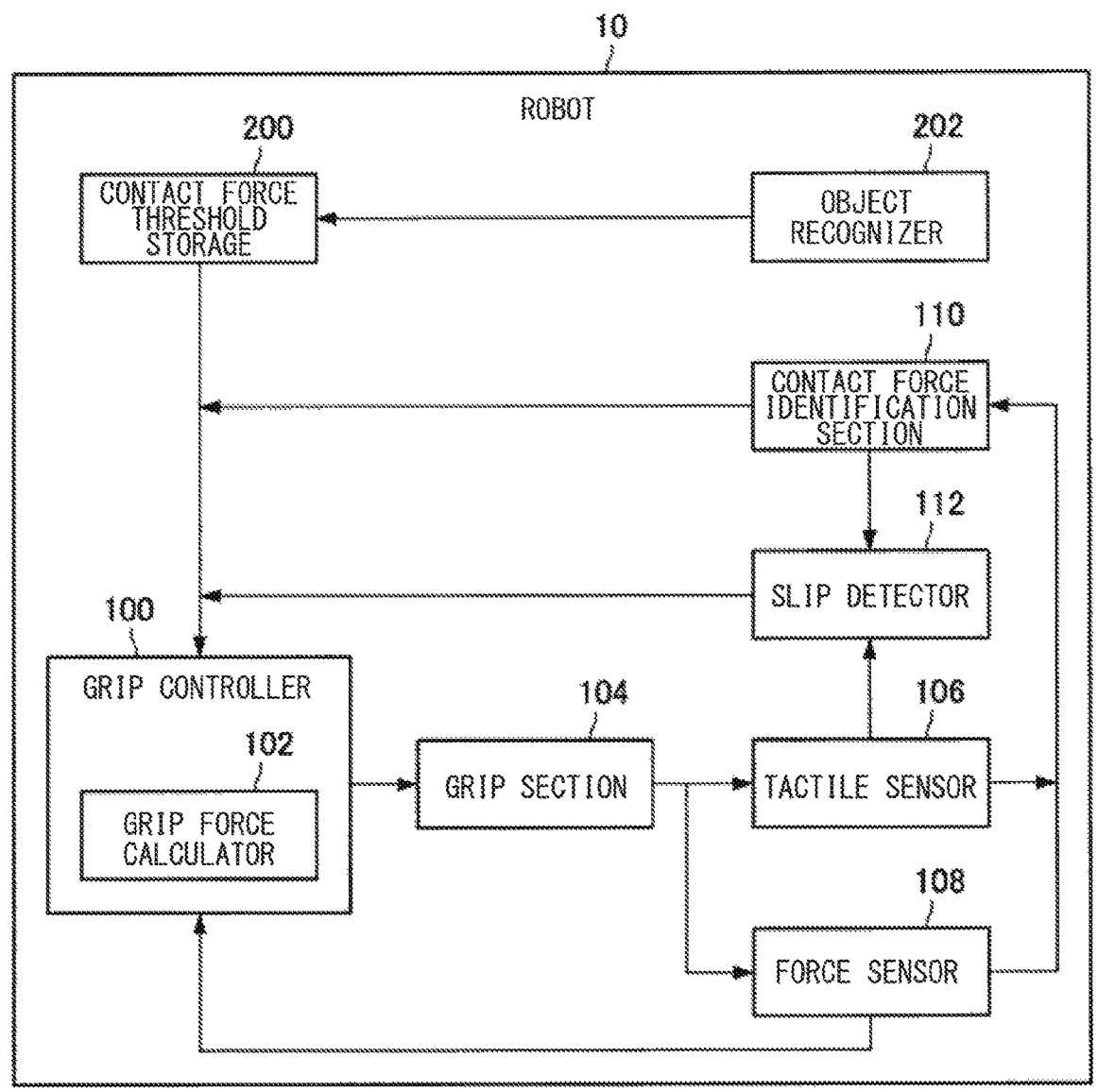

[FIG. 7]
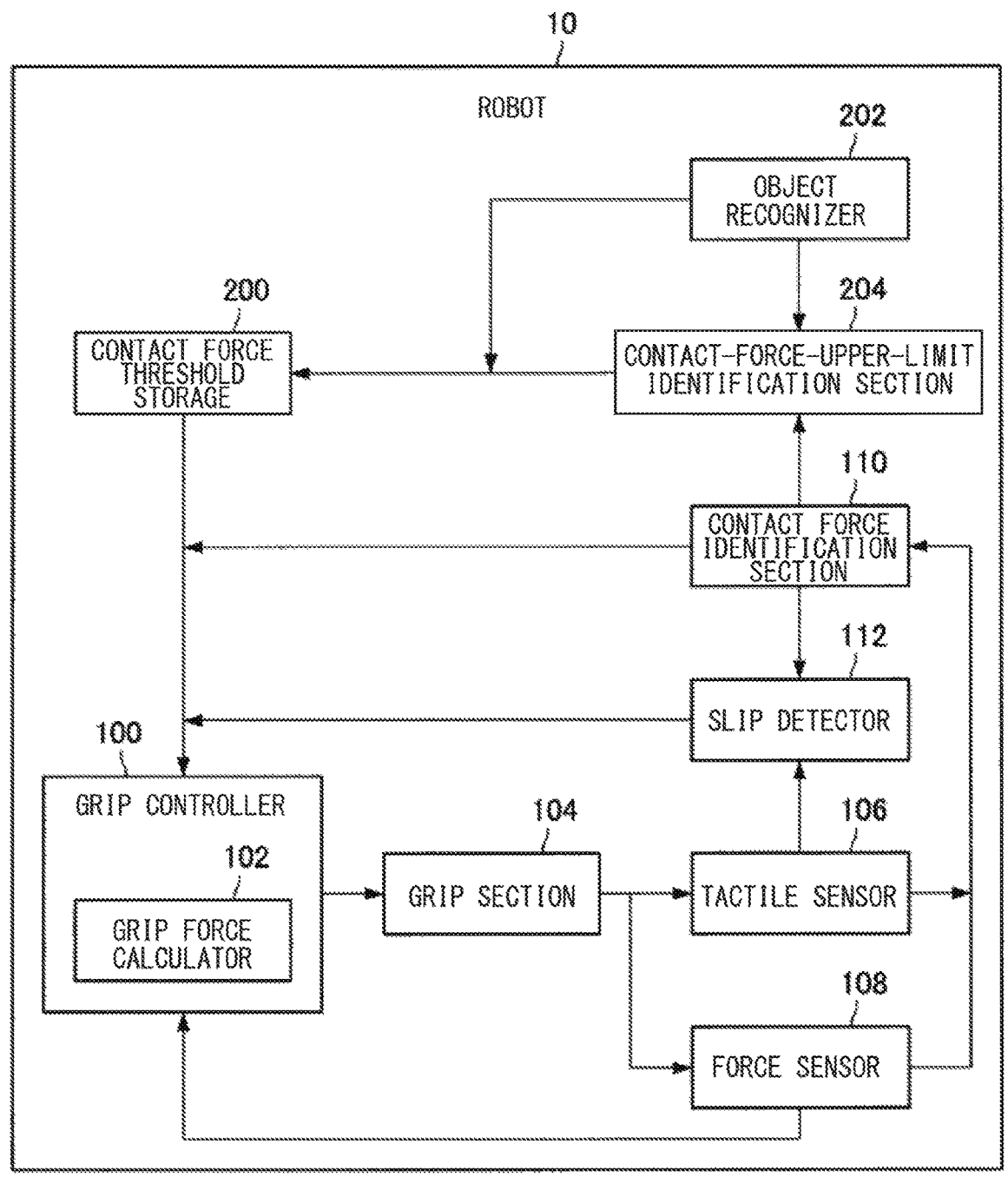

[FIG. 8]
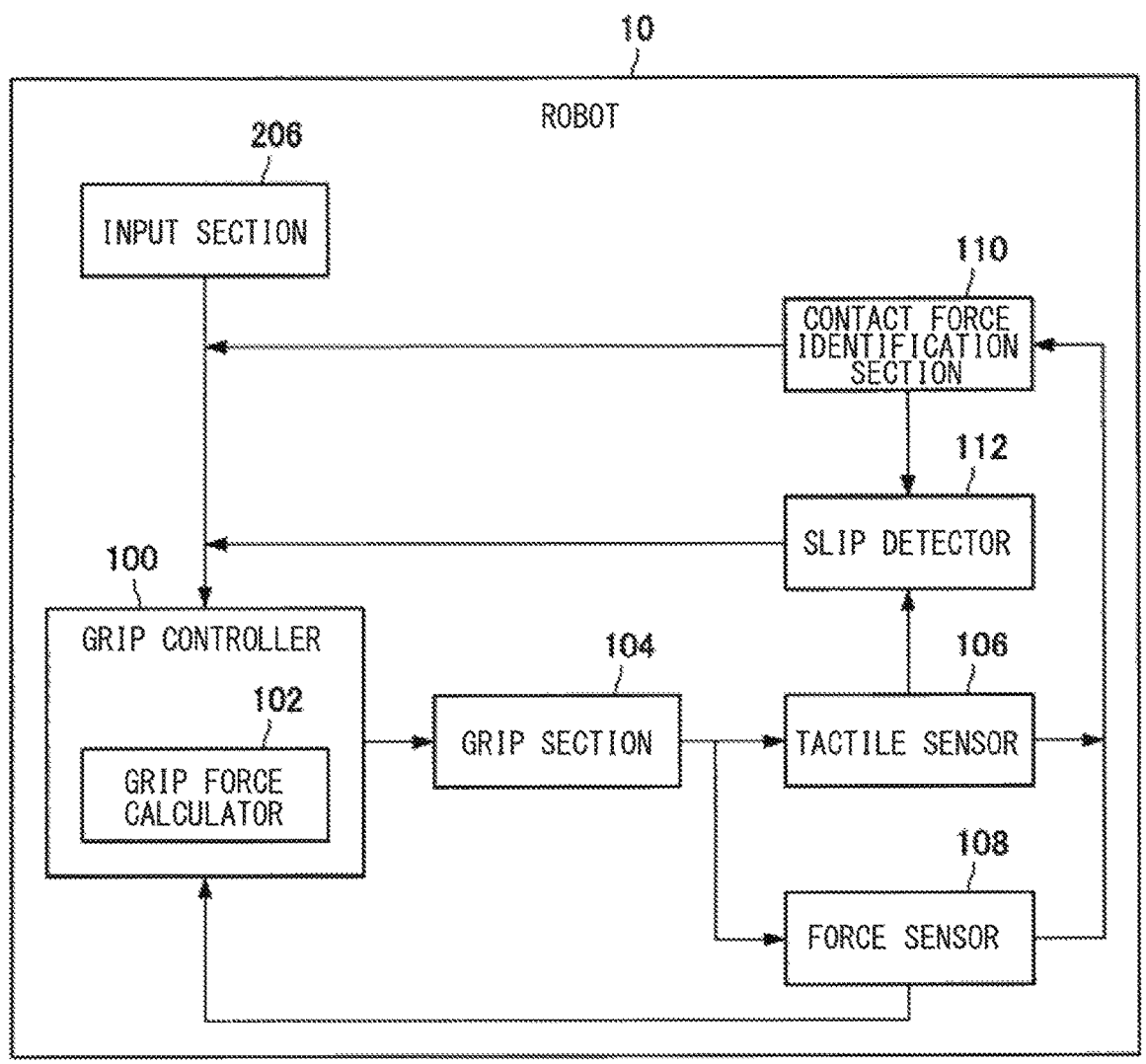

[ FIG. 9 ]
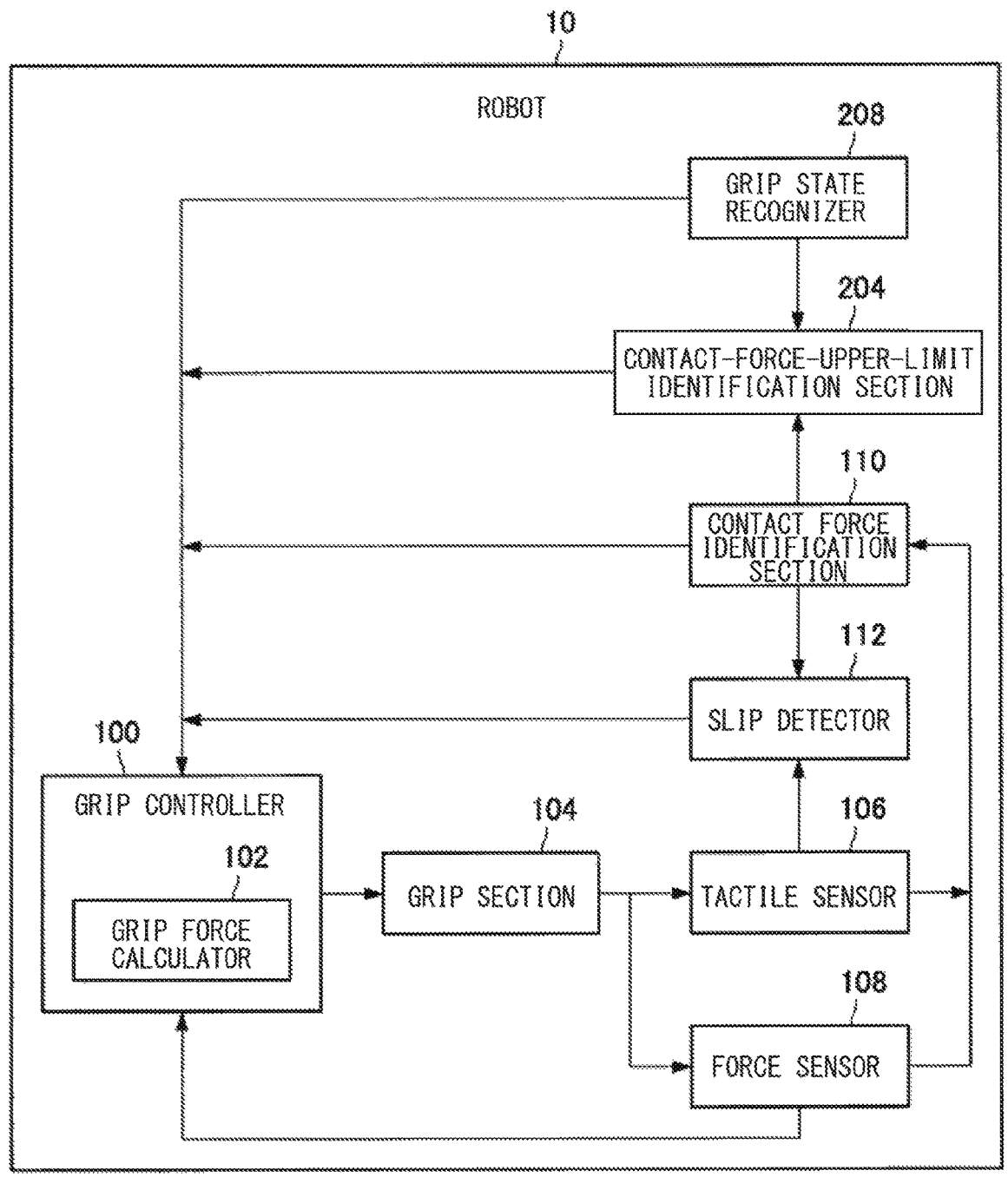

[FIG. 10]
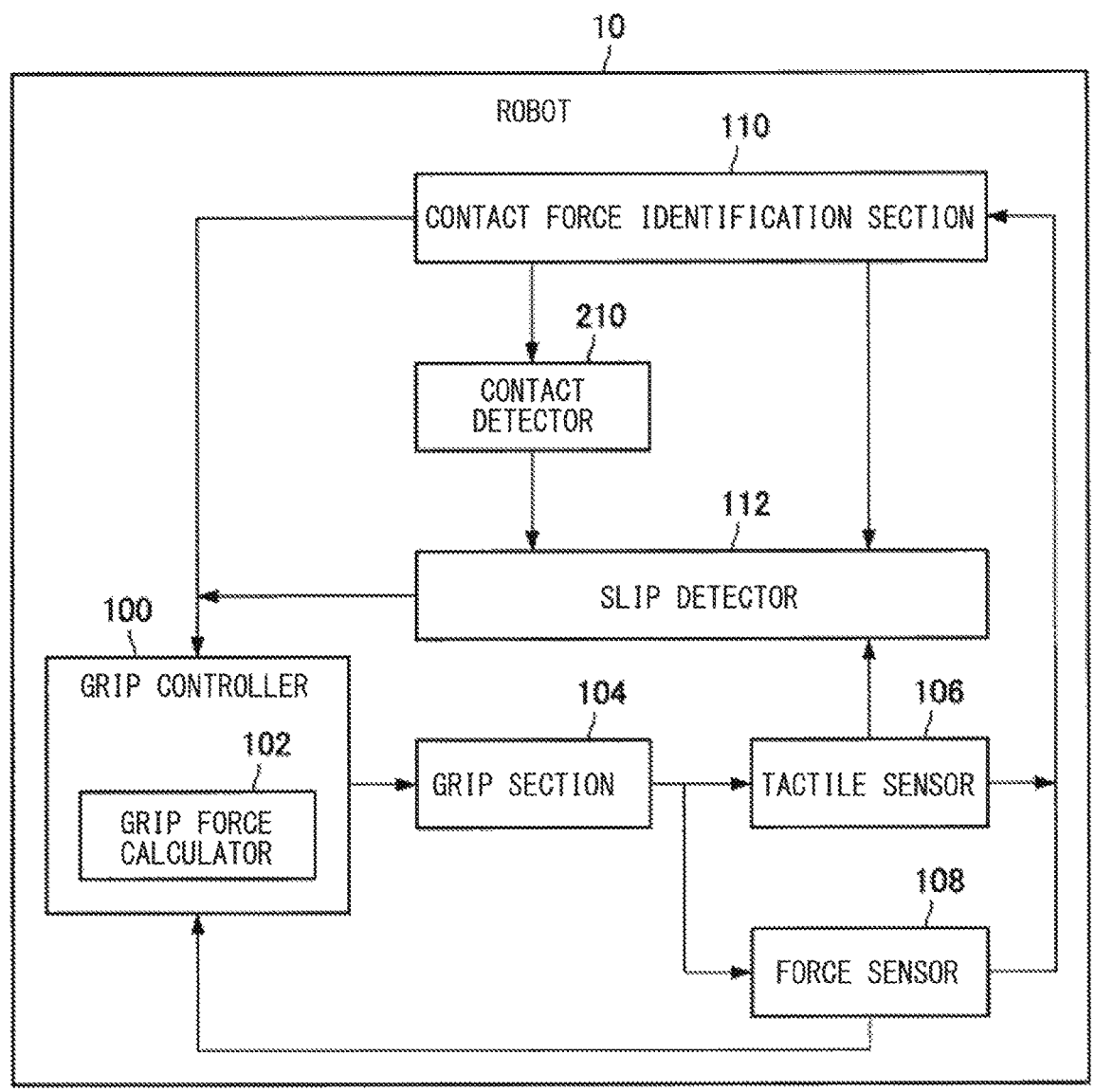

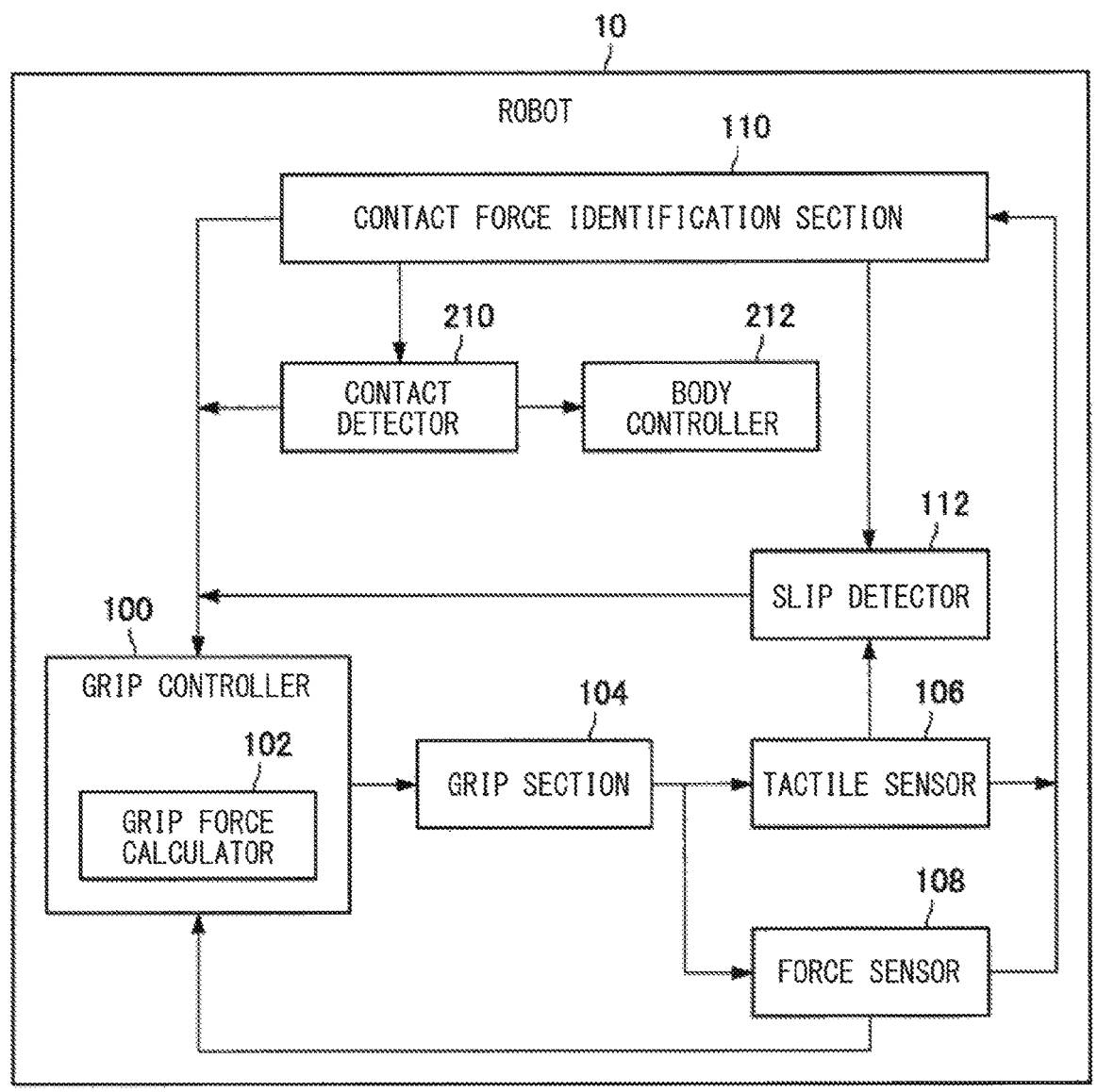

[ FIG. 12 ]
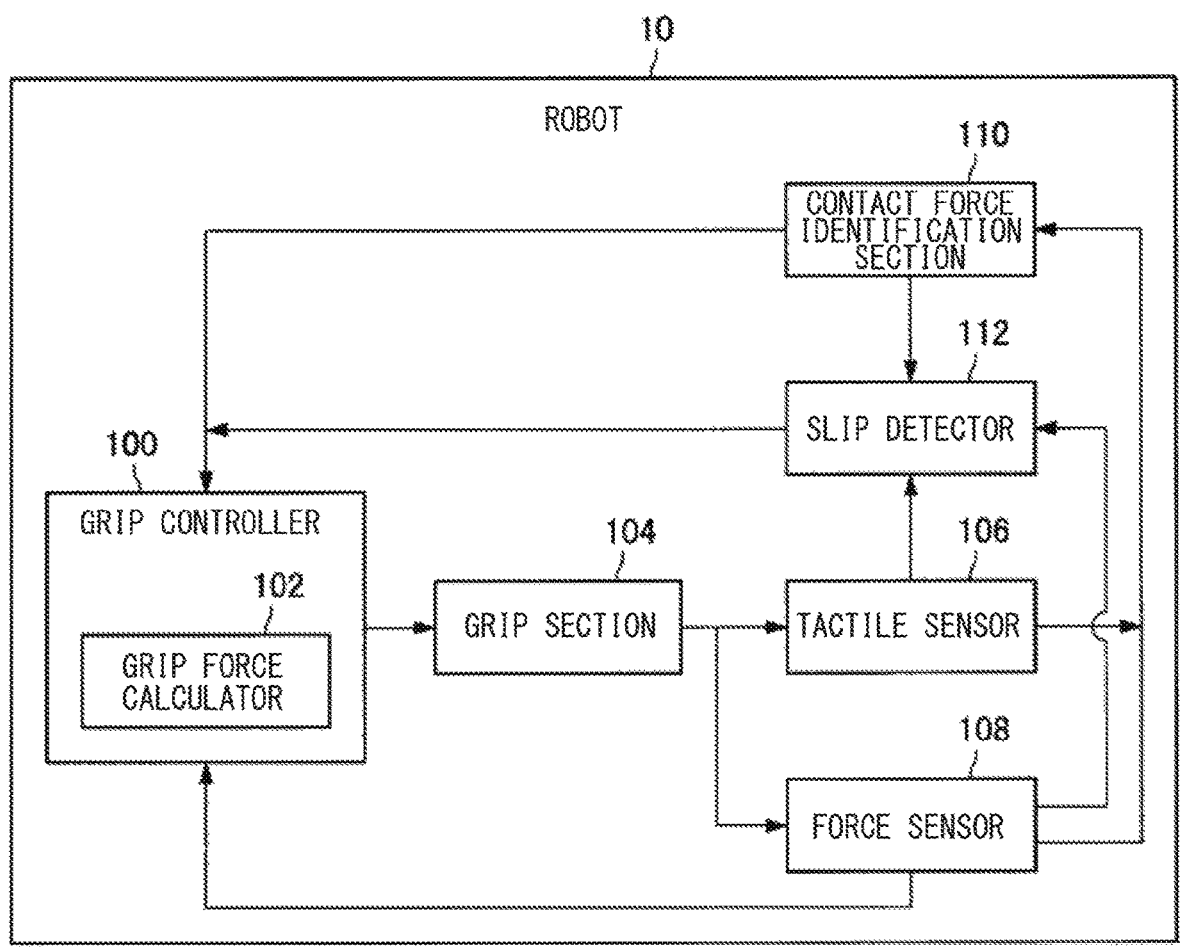

CONTROL DEVICE, CONTROL METHOD, AND PROGRAM

CROSS REFERENCE TO PRIOR APPLICATION

This application is a National Stage Patent Application of PCT International Patent Application No. PCT/JP2019/001901 (filed on Jan. 22, 2019) under 35 U.S.C. § 371, which claims priority to Japanese Patent Application No. 2018-059544 (filed on Mar. 27, 2018), which are all hereby incorporated by reference in their entirety.

TECHNICAL FIELD

The present disclosure relates to a control device, a control method, and a program.

BACKGROUND ART

Various machines having a structure for gripping an object (e.g., a robot hand, a gripper, etc.) have been proposed.

For example, PTL 1 below describes a technique for detecting contact with an object by using a plurality of pressure detection elements disposed at a predetermined joint part of a robot hand.

CITATION LIST

Patent Literature

PTL 1: Japanese Unexamined Patent Application Publication No. 2009-66714

SUMMARY OF THE INVENTION

Problems to be Solved by the Invention

However, the technique described in PTL 1 calculates a contact force of when the robot hand and the object come into contact with each other using only a sensing result obtained by the pressure detection elements. For this reason, the technique described in PTL 1 has room to increase accuracy of the calculation of the contact force.

Accordingly, the present disclosure proposes a control device, a control method, and a program which are novel and improved, and are able to appropriately control a grip force of when a contact section and an object come into contact with each other.

Means for Solving the Problems

According to the present disclosure, there is provided a control device including a grip controller that controls a grip force related to a contact section depending on a contact force of when the contact section and an object come into contact with each other, the contact force being based on a sensing result obtained by a tactile sensor disposed at the contact section and a sensing result obtained by a force sensor disposed at the contact section.

Further, according to the present disclosure, there is provided a control method including controlling, by a processor, a grip force related to a contact section depending on a contact force of when the contact section and an object come into contact with each other, the contact force being based on a sensing result obtained by a tactile sensor disposed at the contact section and a sensing result obtained by a force sensor disposed at the contact section.

Further, according to the present disclosure, there is provided a program for causing a computer to function as a grip controller that controls a grip force related to a contact section depending on a contact force of when the contact section and an object come into contact with each other, the contact force being based on a sensing result obtained by a tactile sensor disposed at the contact section and a sensing result obtained by a force sensor disposed at the contact section.

Effects of the Invention

As described above, according to the present disclosure, it is possible to appropriately control the grip force of when the contact section and the object come into contact with each other. It should be noted that the effects described here are not necessarily limitative, and may be any of effects described in the present disclosure.

BRIEF DESCRIPTION OF DRAWINGS

FIG. 1 is a diagram illustrating an example of a physical configuration of a robot 10 according to a first embodiment of the present disclosure.

FIG. 2 is a block diagram illustrating an example of a functional configuration of the robot 10 according to the first embodiment.

FIG. 3 is a block diagram illustrating an example of a detailed configuration of a contact force identification section 110 according to the first embodiment.

FIG. 4 is a flowchart illustrating an example of a flow of a process according to the first embodiment.

FIG. 5 is a block diagram illustrating an example of a functional configuration of the robot 10 according to a second embodiment of the present disclosure.

FIG. 6 is a block diagram illustrating an example of a functional configuration of the robot 10 according to a third embodiment of the present disclosure.

FIG. 7 is a block diagram illustrating an example of a functional configuration of the robot 10 according to a fourth embodiment of the present disclosure.

FIG. 8 is a block diagram illustrating an example of a functional configuration of the robot 10 according to a fifth embodiment of the present disclosure.

FIG. 9 is a block diagram illustrating an example of a functional configuration of the robot 10 according to a sixth embodiment of the present disclosure.

FIG. 10 is a block diagram illustrating an example of a functional configuration of the robot 10 according to a seventh embodiment of the present disclosure.

FIG. 11 is a block diagram illustrating an example of a functional configuration of the robot 10 according to an eighth embodiment of the present disclosure.

FIG. 12 is a block diagram illustrating an example of a functional configuration of the robot 10 according to a ninth embodiment of the present disclosure.

MODES FOR CARRYING OUT THE INVENTION

The following describes a preferred embodiment of the present disclosure in detail with reference to the accompanying drawings. It is to be noted that, in this description and the accompanying drawings, components that have substantially the same functional configuration are indicated by the same reference signs, and thus redundant description thereof is omitted.

Further, in this description and the drawings, components that have substantially the same functional configuration are sometimes distinguished from each other using different alphabets after the same reference sign. For example, components that have substantially the same functional configuration are distinguished from each other, such as a grip section 104*a* and a grip section 104*b*, as appropriate. However, in a case where there is no need in particular to distinguish components that have substantially the same functional configuration, the same reference sign alone is attached to each of the components. For example, in a case where there is no need in particular to distinguish the grip section 104*a* and the grip section 104*b* from each other, the grip section 104*a* and the grip section 104*b* are each simply referred to as grip section 104.

Further, the "modes for carrying out the invention" will be given in the following order.

1. BACKGROUND
2. First Embodiment
3. Second Embodiment
4. Third Embodiment
5. Fourth Embodiment
6. Fifth Embodiment
7. Sixth Embodiment
8. Seventh Embodiment
9. Eighth Embodiment
10. Ninth Embodiment
11. Modification Example

1. Background

The present disclosure may be implemented in various forms, as described in detail in "2. First Embodiment" to "10. Ninth Embodiment" by way of examples. First, a background in which a robot 10 according to each embodiment of the present disclosure has been created will be described for clearly indicating characteristics of the present disclosure.

Various techniques for gripping an object by using a hand section (e.g., a robot hand, a gripper, etc.) have been proposed. It is necessary that in such techniques, a grip force of when the hand section grips the object be appropriately set. For example, it is necessary that a force be set as the grip force which is in a range that the object is not slipped off and the object is not crushed.

It is to be noted that, regarding objects handled in assembly lines of factories and the like, shapes, masses, frictional coefficients, and the like thereof are known in many cases, for example; therefore, it is usually easy in many cases to set appropriate grip forces corresponding to the objects. In contrast, regarding a wide variety of objects located in any environments, such as homes and hospitals, it is usually difficult to set appropriate grip forces, because shapes, masses, or frictional coefficients of the individual objects are often unknown.

In order to solve such an issue, for example, a technique has been proposed in which a pressure distribution sensor is disposed at a tip (fingertip) of the hand section, and a CoP (Center Of Pressure) that changes when displacement (hereinafter, also referred to as "slip") between an object to be gripped and the fingertip occurs is measured, and a grip force is increased on the basis of a result obtained by the measurement.

However, characteristics of the pressure distribution sensor have restrictions on a state of a contact, accuracy of a sensor, spatial resolution, a dynamic range, and the like; therefore, such a technique has low accuracy in calculating a contact force. Due to the low accuracy in calculating the contact force, it is also difficult to accurately detect the slip in such a technique.

Accordingly, a robot 10 according to each embodiment has been created with the above-mentioned circumstances as a point of view. The robot 10 according to each embodiment calculates a contact force of when a grip section 104 and an object come into contact with each other on the basis of a sensing result obtained by a tactile sensor 106 disposed at the grip section 104 and a sensing result obtained by a force sensor 108 disposed at the grip section 104. As described above, according to each embodiment, the sensing result obtained by the tactile sensor 106 and the sensing result obtained by the force sensor 108 are both used; therefore, it is possible to calculate with higher accuracy the contact force of when the grip section 104 and the object come into contact with each other.

The robot 10 according to each embodiment is an example of a control device according to the present disclosure. In each embodiment, the robot 10 may be a device (machine) that is able to act (e.g., perform gripping, etc.) using an electric and/or magnetic effect. For example, the robot 10 may be a mobile or fixed manipulation device. Alternatively, the robot 10 may be a humanoid robot, a pet robot, various industrial machinery, a vehicle (e.g., an autonomous driving car, a vessel, or a flight vehicle (e.g., a drone, etc.)), or a toy, etc. Hereinafter, contents of each embodiment will be described in detail.

2. First Embodiment

2-1. Physical Configuration

Next, a first embodiment according to the present disclosure will be described. First, referring to FIG. 1, a physical configuration of the robot 10 according to the first embodiment will be described.

As illustrated in FIG. 1, the robot 10 may include at least one grip section 104 and an actuator 130 that drives the grip section 104. Also, as illustrated in FIG. 1, a tactile sensor 106 may be disposed over all or a portion of a surface of the grip section 104. Further, a force sensor 108 may be disposed in a disposition region of the actuator 130.

2-1-1. Grip Section 104

The grip section 104 is an example of a contact section according to the present disclosure. The grip section 104 has a structure that enables the grip section 104 to grip an external object (an object 20 in the example illustrated in FIG. 1). In the example illustrated in FIG. 1, an example is indicated in which the grip section 104 is a robot finger, but the first embodiment is not limited to such an example. The structure of the grip section 104 is not particularly limited as long as the structure enables the grip section 104 to grip the object. For example, the robot 10 may have one or more robot arms (not illustrated). In this case, the grip section 104 may be disposed at a tip of the robot arm as a hand section (e.g. a robot hand, a gripper, an end effector, or the like). Alternatively, the robot 10 may have a plurality of leg parts. In this case, the grip section 104 may be disposed as a tip part of one of the leg parts (e.g. a foot part).

2-1-2. Tactile Sensor 106

The tactile sensor 106 may be configured to be able to, upon coming into contact with the object, measure a contact position (e.g., a contact center position, etc.) with the object and the total number of individual contact points (hereinafter each may be referred to as contact portion). For example, the tactile sensor 106 may be a pressure distribution sensor, a uniaxial force sensor array, a triaxial force sensor array, a vision sensor, or a sensor using a laser, and the like. Here, the pressure distribution sensor may be a sensor in which a plurality of pressure detection elements is arranged on an array. The pressure distribution sensor may then sense the contact with the object by detecting the pressures applied to the respective plurality of pressure detection elements. In addition, the vision sensor may sense the contact with the object by measuring, by a camera, deformation of a material of a sensor surface that has occurred by the contact with object. Further, the sensor using a laser may sense a presence or absence of the contact between the sensor surface and the object by using a laser.

The tactile sensor 106 may further be able to measure a contact force strength ratio between contact points. Here, the contact force may be a force generated at a point of coming into contact with the object. Alternatively, the tactile sensor 106 may further be able to measure an absolute value of a normal force at each contact point and/or an absolute value of a shear force at each contact point.

In addition, the tactile sensor 106 may transmit a sensing result (e.g., the total number of contact points, the position information of each contact point, the contact force strength ratio between contact points, etc.) to a contact force identification section 110 and a slip detector 112.

2-1-3. Force Sensor 108

The force sensor 108 may be configured to be able to measure a resultant force of the contact forces (in other words, reaction forces from the object) applied to the surface of the grip section 104 of when the object and the grip section 104 come into contact with each other. Alternatively, the force sensor 108 may be configured to be able to measure a force, a torque, or a moment generated by the actuator 130.

For example, the force sensor 108 may be a triaxial force sensor or a six-axis force sensor. Alternatively, a torque sensor may be disposed in the actuator 130 and the force sensor 108 may be the torque sensor. In this case, the force sensor 108 may measure the torque generated by the actuator 130 (as a generation force of the actuator 130).

In addition, the force sensor 108 may transmit a sensing result (the force, the torque, or the moment) to the contact force identification section 110 and a grip controller 100.

2-1-4. Actuator 130

The actuator 130 may generate a force (or a torque) corresponding to a target command value in accordance with a control of the grip controller 100 to be described later. The generated force is transmitted to the grip section 104 whereby the grip section 104 may move. For example, the actuator 130 drives in accordance with the control of the grip controller 100 to enable the grip section 104 to generate a target grip force (in other words, a force, a moment, or a torque that the actuator 130 should generate).

The actuator 130 may be disposed between the grip section 104 and a body (not illustrated) of the robot 10, as illustrated in FIG. 1. For example, in a case where the robot 10 has a robot arm coupled to the grip section 104, the actuator 130 may be disposed within the robot arm.

2-2. Functional Configuration

The physical configuration of the robot 10 according to the first embodiment has been described above. Next, referring to FIG. 2, a functional configuration of the robot 10 according to the first embodiment will be described. FIG. 2 is a block diagram illustrating an example of the functional configuration of the robot 10 according to the first embodiment. As illustrated in FIG. 2, the robot 10 includes the grip controller 100, the grip section 104, the tactile sensor 106, the force sensor 108, the contact force identification section 110, and the slip detector 112. Hereinafter, description of the same contents as those described above will be omitted.

2-2-1. Contact Force Identification Section 110

The contact force identification section 110 is an example of the contact force calculator according to the present disclosure. The contact force identification section 110 may include a processing circuit such as CPU (Central Processing Unit) or GPU (Graphics Processing Unit). Further, the contact force identification section 110 may include a memory such as ROM (Read Only Memory) or RAM (Random Access Memory).

The contact force identification section 110 calculates a contact force of when the grip section 104 and an object come into contact with each other on the basis of a sensing result obtained by the tactile sensor 106 and a sensing result obtained by the force sensor 108. For example, when the grip section 104 and the object come into contact with each other at one or more points, the contact force identification section 110 calculates the contact forces at the respective individual contact points on the basis of: pieces of information related to the respective individual contact points identified on the basis of the sensing result obtained by the tactile sensor 106; and the sensing result obtained by the force sensor 108. As will be described below, the pieces of information related to the respective individual contact points include, for example, the total number of contact points, pieces of position information of the respective individual contact points, and the contact strength ratio between individual contact points.

Referring now to FIG. 3, a more detailed configuration of the contact force identification section 110 will be described. FIG. 3 is a block diagram illustrating the more detailed configuration of the contact force identification section 110. As illustrated in FIG. 3, the contact force identification section 110 may include a number-of-contact-portions calculator 150, a contact position calculator 152, a contact strength calculator 154, and a contact force calculator 156.

2-2-2. Number-of-Contact-Portions Calculator 150

The number-of-contact-portions calculator 150 calculates the total number of contact points (contact portions) on the basis of the sensing result obtained by the tactile sensor 106 when it is detected that the grip section 104 and the object are in contact with each other at one or more points. In this case, for example, the number-of-contact-portions calculator 150 calculates the total number of contact points on the basis of a calculation method corresponding to a type of the tactile sensor 106 and the sensing result obtained by the tactile sensor 106.

For example, in the case where the tactile sensor 106 includes the pressure distribution sensor, the number-of-contact-portions calculator 150 first identifies (calculates) the number of local maximum points of the pressure sensed by the tactile sensor 106, or identifies individual points at which the slope of the pressure distribution approaches "0". Thereafter, the number-of-contact-portions calculator 150 calculates the total number of contact points on the basis of these identified results.

Alternatively, in the case where the tactile sensor 106 includes the vision sensor, the number-of-contact-portions calculator 150 first identifies, on the basis of the sensing result obtained by the tactile sensor 106, a change in a deformation amount of a surface of the tactile sensor 106 based on the contact between the grip section 104 and the object. Thereafter, the number-of-contact-portions calculator 150 calculates the total number of contact points on the basis of the specified result.

2-2-3. Contact Position Calculator 152

The contact position calculator 152 identifies a position relationship of each of all corresponding contact points (hereinafter may be referred to as "each contact point") on the basis of the sensing result obtained by the tactile sensor 106. For example, the contact position calculator 152 identifies the position information of each contact point (e.g., the position information of the center position of each contact point, etc.) on the basis of the sensing result obtained by the tactile sensor 106. For example, for each contact point, the contact position calculator 152 identifies information of a relative position of the contact point on the tactile sensor 106 as the position information of the contact point on the basis of the sensing result obtained by the tactile sensor 106. Here, the information of the relative position of each contact point may be expressed in a form of coordinates with an end point of the tactile sensor 106 set as the origin. However, the information of the relative position of each contact point is not limited to such an example, and may be defined as information of a relative position with reference to any other position enables a torque or a moment generated by the actuator 130 to be calculated.

2-2-4. Contact Strength Calculator 154

The contact strength calculator 154 calculates a contact force strength ratio between corresponding contact points (e.g., regarding one contact point as a reference, a ratio of each contact strength of another contact point to a contact strength of the one contact point) on the basis of the sensing result obtained by the tactile sensor 106. Advantages of such a calculation method include the following. For example, in a case where an error having a gain corresponding to a certain factor as a whole is included in a predetermined sensing result (e.g., temperature identification, etc.), it is possible to minimize an influence of the error because the gain may be cancelled out by using the contact force strength ratio between contact points.

2-2-5. Contact Force Calculator 156

The contact force calculator 156 calculates the contact force at each contact point on the basis of the total number of contact points calculated by the number-of-contact-portions calculator 150, the position information of each contact point identified by the contact position calculator 152, the contact force strength ratio between contact points calculated by the contact strength calculator 154, and the sensing result obtained by the force sensor 108. For example, on the basis of a determination result as to whether or not it is possible to identify the resultant force of the contact forces between the contact strength calculator 154 and the contact points (i.e., the resultant force of the contact forces at the respective contact points), the contact force calculator 156 calculates the contact force at each contact point using the calculation result obtained by the number-of-contact-portions calculator 150, the calculation result obtained by the contact position calculator 152, and the calculation result obtained by the grip section 104

2-2-5-1. Calculation Example 1

For example, in a case where it is possible to identify the resultant force of the contact forces between the grip section 104 and the object on the basis of the sensing result obtained by the force sensor 108, the contact force calculator 156 calculates the contact force at each contact point using the following calculation methods. It is to be noted that specific examples of such a case include a case in which the force sensor 108 includes a triaxial force sensor and the triaxial force sensor is disposed on the opposite side of the grip section 104 from the surface that grips the object.

—A Case where the Number of Contact Points is One

For example, first, the contact force calculator 156 determines whether the total number of contact points calculated by the number-of-contact-portions calculator 150 is one, two, or three or more. Thereafter, in a case where the total number of contact points is one, the contact force calculator 156 calculates the resultant force itself sensed by the force sensor 108 as the contact force at the corresponding contact point.

—A Case where the Number of Contact Points is Two

Further, in a case where the total number of contact points is two, the contact force calculator 156 first calculates distances l1 and l2 from a predetermined reference position (e.g., an end point of the tactile sensor 106 or the like) to the respective contact points on the basis of the pieces of position information of the respective contact points identified by the contact position calculator 152. Here, the contact forces at the respective contact points are respectively defined as F1 and F2, and the resultant force of the contact forces sensed by the force sensor 108 is defined as Fall. In this case, the contact force calculator 156 determines F1 and F2 from the following equations (1) and (2).

[Math 1]

$$\tau = l_1 F_1 + l_2 F_2 \qquad \text{Equation (1)}$$

$$F_1 = \frac{\tau - l_2 F_{all}}{l_1 - l_2}, F_2 = \frac{-\tau + l_1 F_{all}}{l_1 - l_2} \qquad \text{Equation (2)}$$

It is to be noted that Fall, F1, and F2 may have a relations of the following equation (3).

[Math 2]

$$F_{all} = F_1 + F_2 \qquad \text{Equation (3)}$$

—A Case where the Number of Contact Points is Three or More

Next, a method of calculating contact forces at the respective contact points in the case where the total number of contact points is three or more will be described. Now, the total number of contact points is defined as N, the contact force at each contact point is defined as Fi (i=1 to N), the contact force strength ratio between contact points calculated by the contact strength calculator 154 is defined as αi (i=1 to N), and the resultant force of the contact forces sensed by the force sensor 108 is defined as Fall. In this case, the contact force calculator 156 calculates Fi using the following equation (4).

[Math 3]

$$F_i = \alpha_i \frac{F_{all}}{\sum_1^N \alpha_k}$$

Equation (4)

It is to be noted that Fall and Fi may have a relationship of the following equation (5).

[Math 4]

$$F_{all} = \Sigma_1^N F_i$$

Equation (5)

2-2-5-2. Calculation Example 2

Next, a method of calculating a contact force by the contact force calculator 156 in a case where it is not possible to identify the resultant force of the contact forces between the grip section 104 and the object and it is possible to measure the generation force of the actuator 130 (hereinafter, sometimes referred to as "T") by the force sensor 108 will be described. It is to be noted that specific examples of such a case include a case where the force sensor 108 includes a torque sensor and the torque sensor is disposed in the actuator 130.

—A Case where the Number of Contact Points is One

In this case, the contact force calculator 156 calculates the contact force at each contact point using the following calculation methods, for example. First, the contact force calculator 156 determines whether the total number of contact points calculated by the number-of-contact-portions calculator 150 is one or two or more. Thereafter, in a case where the total number of contact points is one, the contact force calculator 156 first calculates the distance l1 from a predetermined reference position (e.g., the end point of the tactile sensor 106 or the like) to the corresponding contact point on the basis of position information of each contact point identified by the contact position calculator 152. Then, the contact force calculator 156 calculates the contact force (F1) at the corresponding contact point by using the generation force (i.e., τ) of the actuator 130 sensed by the force sensor 108, l1, and the following equation (6).

[Math 5]

$$F_i = \frac{\tau}{l_i}$$

Equation (6)

—A Case where the Number of Contact Points is Two or More

Next, a method of calculating contact forces at the respective contact points in the case where the total number of contact points is two or more will be described. Now, the total number of contact points is defined as N, the contact force at each contact point is defined as Fi (i=1 to N), the contact force strength ratio between contact points calculated by the contact strength calculator 154 is defined as αi (i=1 to N), the distance from the predetermined reference position (e.g., the end point of the tactile sensor 106 or the like) to each contact point is defined as li (i=1 to N), and the generation force of the actuator 130 sensed by the force sensor 108 is defined as T. In this case, the contact force calculator 156 calculates Fi using the following equation (7).

[Math 6]

$$F_i = \alpha_i \frac{\tau}{\sum_1^N (\alpha_k l_k)}$$

Equation (7)

It is to be noted that T and Fi may have a relationship of the following equation (8).

[Math 7]

$$\tau = \Sigma_1^N l_k F_k$$

Equation (8)

2-2-5-3. Transmission of Calculation Result

In addition, the contact force calculator 156 may transmit the calculated contact force at each contact point to the grip controller 100.

2-2-6. Slip Detector 112

The slip detector 112 may include the above-mentioned processing circuit. The slip detector 112 may further include the above-mentioned memory. The slip detector 112 detects a slip amount of the object with respect to the grip section 104 during the time in which the grip section 104 and the object are in contact with each other on the basis of the sensing result obtained by the tactile sensor 106. For example, the slip detector 112 detects the slip amount of the object on the basis of the contact force at the individual contact point calculated by the contact force identification section 110 and the sensing result obtained by the tactile sensor 106.

Here, in each embodiment, the "slip" may mean a relative movement (relative displacement) between a surface of the grip section 104 and the object, and a precursor phenomenon of occurrence of the relative movement. The precursor phenomenon is, for example, a phenomenon in which a portion of the surface of the grip section 104 that is in contact with object slips or peels (sometimes referred to as local slip). For example, the slip detector 112 may detect the slip of the object (e.g., the precursor phenomenon) on the basis of a detection result of a CoP movement, a detection result of a change in an area of a contact region, a detection result of a change in a contact position, or the like.

Further, the slip detector 112 may also transmit a detection result (e.g., a detection result of the slip amount a detection result of a presence or absence of the slip, and/or a slip dependent change amount) to the grip controller 100.

2-2-7. Grip Controller 100

The grip controller 100 may include the above-mentioned processing circuit. The grip controller 100 may further include the above-mentioned memory. As illustrated in FIG. 2, the grip controller 100 includes a grip force calculator 102.

The grip controller 100 controls a motion of the grip section 104 on the basis of a target grip force (i.e., a force with which the grip section 104 grips the object) calculated by the grip force calculator 102 to be described later. For example, the grip controller 100 controls the driving of the actuator 130 to cause a present grip force of the grip section 104 to be brought near the target grip force calculated by the grip force calculator 102.

Further, the grip controller 100 may perform known a feedback control on the grip section 104 on the basis of the sensing results sequentially obtained by the force sensor 108.

2-2-8. Grip Force Calculator 102

The grip force calculator 102 calculates the target grip force of the grip section 104 on the basis of the contact force at the individual contact point calculated by the contact force identification section 110 and the slip amount of the object to be gripped detected by the slip detector 112.

For example, in a case where occurrence of a slip is detected by the slip detector 112, the grip force calculator 102 calculates, as the target grip force, a value that corresponds to the slip amount detected by the slip detector 112 and is greater than the present grip force of the grip section 104. Further, in a case where the slip detector 112 detects that the slip that is occurring has stopped, the grip force calculator 102 calculates the target grip force of the grip section 104 so that the grip force of the grip section 104 (after the present time point) is gradually decreased.

2-3. Flow of Process

The functional configuration of the robot 10 according to the first embodiment has been described above. Next, referring to FIG. 4, a flow of a process according to the first embodiment will be described. FIG. 4 is a flow chart illustrating an example of the flow of the process according to the first embodiment. Hereinafter, an example of a flow of a process in a scene where the robot 10 grips a target object will be described.

As illustrated in FIG. 4, first, the contact force identification section 110 of the robot 10 detects whether or not the grip section 104 comes into contact with the target object on the basis of the sensing result obtained by the tactile sensor 106 (S101). If the grip section 104 does not come into contact with the target object (S101: No), the contact force identification section 110 repeats S101, e.g., after a predetermined period of time has elapsed.

In contrast, if it is detected that the grip section 104 comes into contact with the target object (S101: Yes), the contact force identification section 110 calculates the total number of contact points between the grip section 104 and the object, the position information of each contact point, and the contact strength ratio between contact points, on the basis of the sensing result obtained by the tactile sensor 106 (S103).

Subsequently, the contact force identification section 110 calculates the contact force at each contact point on the basis of the calculation result obtained in S103 and the sensing result obtained by the force sensor 108 (e.g., the sensing result obtained in the latest S101) (S105).

Subsequently, the slip detector 112 detects the slip amount of the object with respect to the grip section 104 on the basis of the contact force at each contact point calculated in S105 and the sensing result obtained by the tactile sensor 106 (e.g., the sensing result obtained in the latest S101) (S107).

Subsequently, the grip force calculator 102 calculates the target grip force of the grip section 104 on the basis of the contact force at each contact point calculated in S105 and the slip amount of the object detected in S107. For example, the grip force calculator 102 calculates a force that the actuator 130 should generate to cause the grip force of the grip section 104 to reach the target grip force, on the basis of the contact force at each contact point and the detected slip amount of the object (S109).

Thereafter, the grip controller 100 controls the driving of the actuator 130 on the basis of the target grip force (or the force that the actuator 130 should generate) calculated in S109 (S111).

2-4. Effects

2-4-1. Effect 1

As described above, the robot 10 according to the first embodiment calculates the contact force of when the grip section 104 and the object come into contact with each other on the basis of the sensing result obtained by the tactile sensor 106 disposed at the grip section 104 and the sensing result obtained by the force sensor 108 disposed at the grip section 104. In this way, according to the first embodiment, the sensing result obtained by the tactile sensor 106 and the sensing result obtained by the force sensor 108 are both used; therefore, it is possible to calculate with higher accuracy the contact force of when the grip section 104 and the object come into contact with each other. For example, it is possible to calculate with higher accuracy the contact force at each contact point of when the grip section 104 and object come into contact with each other at a plurality of contact points. It is also possible to robustly change contact force calculation algorithms depending on a sensor system and a disposition of the tactile sensor 106.

2-4-2. Effect 2

Further, according to the first embodiment, it is possible to calculate with high accuracy the contact force of when the grip section 104 and the object come into contact with each other, which makes it possible to detect with higher accuracy the slip amount of the object with respect to the grip section 104. For example, it is possible to detect with higher accuracy the slip which varies depending on the magnitude of the contact force. The increase in the accuracy of detecting the slip enables the grip section 104 to grip the object with less force. Even in a case where a reaction force from an object to be gripped is low, e.g. a flexible object or a fragile object, the grip section 104 is able to safely grip the corresponding object.

2-4-3. Effect 3

In addition, since it is possible to calculate with high accuracy the contact force of when the grip section 104 and the object come into contact with each other, it is possible to detect more accurately a contact timing of the grip section 104 and the object. For example, according to the first embodiment, not only the sensing result obtained by the tactile sensor 106 but also the sensing result obtained by the force sensor 108 is used at the same time, which makes it possible to increase a contact sensitivity (e.g., a contact sensitivity of the tip (e.g., the fingertip) of the grip section 104) compared to the technology of the past. This enables more accurate detection of the contact timing.

As a result, the following three effects are obtained. First, it becomes possible for the grip section 104 to grip the corresponding object more appropriately. Second, it becomes possible to flexibly adjust a timing at which the slip detector 112 starts the slip detecting process, for example. This makes it possible to reduce a processing load on the robot 10 in a period other than a period in which the grip section 104 grips the object.

Third, since it is possible to detect the contact timing more accurately, it is possible to switch a control at a more accurate timing in a scene in which the robot 10 switches the control at the contact timing. For example, in a scene in which a control system or a parameter (e.g., a target value of a velocity or a force) is changed at the contact timing (e.g., an opening and closing action of the grip section 104 is paused at the contact timing), the robot 10 is able to change the control system or the parameter at a more accurate timing. As a result, it becomes possible to cope with various situations more broadly and more appropriately as compared to existing techniques. For example, the robot 10 is able to safely grip the object without knocking down or moving the object. In addition, in a scene in which a task of gripping an object handed directly from a human or another robot is to be executed, the robot is able to set the gripping timing more appropriately, thereby being able to execute the task more appropriately.

2-4-4. Effect 4

Further, according to the first embodiment, it is also possible to more accurately calculate contact forces even at a time of multi-point contact. As a result, the following three effects are obtained. First, even if the object to be gripped has a complicated shape, it is possible to safely grip the object, without breaking the object. Second, even if the object to be gripped has a complicated shape, it is possible to appropriately detect the slip amount of the object. This enables the robot 10 to safely grip the object without slipping off the object. Third, even in a case where a slip occurs at one or more of all corresponding contact points, it is possible to detect the slip with high accuracy. Therefore, it is possible to grip the corresponding object more safely.

2-4-5. Effect 5

Further, according to the first embodiment, it is possible to use various types of sensors, such as a pressure distribution sensor or a vision sensor, for example, as the tactile sensor 106, and a range from which a sensor system is to be selected is wide. Therefore, it is possible to select an appropriate processing method corresponding to a form of the robot 10 or a form of the sensor mounted on the robot 10.

2-4-6. Effect 6

In addition, according to the first embodiment, even in a case where the object comes into contact with any position in an area that is sensable by the tactile sensor 106, it is possible to calculate the contact force at each contact point. This may eliminate the necessity for a position adjustment when the grip section 104 grips the object. As a result, the following three effects are obtained. First, it becomes possible to grip the target object more quickly. Second, there is no necessity for mounting an additional sensor (e.g., a camera, etc.) on the robot 10 for the position adjustment. Third, it is possible to make larger an allowable range of an error due to deformation or the like of a structural member supporting the grip section 104. This makes it possible to reduce a strength of the corresponding structural member, and thereby making it possible to reduce a weight of the robot 10 and to reduce a cost.

3. Second Embodiment

The first embodiment has been described above. Next, a second embodiment according to the present disclosure will be described. As will be discussed later, the second embodiment enables a user to specify an upper limit of the contact force between the grip section 104 and the object. It is to be noted that a physical configuration of the robot 10 according to the second embodiment may be the same as that of the first embodiment illustrated in FIG. 1. Further, regarding each of third to ninth embodiments to be described later, a physical configuration of the robot 10 may be the same as that of the first embodiment. In the following description, only the contents differing from the first embodiment will be described, and the description of the same contents will be omitted.

3-1. Functional Configuration

Next, referring to FIG. 5, a functional configuration of the robot 10 according to the second embodiment will be described. FIG. 5 is a block diagram illustrating an example of the functional configuration of the robot 10 according to the second embodiment. As illustrated in FIG. 5, the robot 10 according to the second embodiment further includes a contact force threshold storage 200 compared to the first embodiment illustrated in FIG. 2.

3-1-1. Contact Force Threshold Storage 200

The contact force threshold storage 200 stores an upper limit of the contact force of when the grip section 104 and the object come into contact with each other, which has been specified by the user in advance (hereinafter referred to as "specified upper limit of the contact force"). The specified upper limit of the contact force may be the same value, independent of a type of the object to be gripped.

3-1-2. Grip Force Calculator 102

The grip force calculator 102 according to the second embodiment calculates the target grip force (after the present time point) of the grip section 104 on the basis of the specified upper limit of the contact force stored in the contact force threshold storage 200. For example, the grip force calculator 102 calculates the upper limit of the force that the actuator 130 should generate, to cause the contact force at each contact point between the grip section 104 and the object to be less than or equal to the specified upper limit of the contact force stored in the contact force threshold storage 200.

3-2. Effects

As described above, according to the second embodiment, the user is able to specify the upper limit of the contact force between the grip section 104 and the object. Accordingly, it is possible to control the robot 10 to cause the contact force not to be excessively large; therefore, the robot 10 is able to safely grip the object even if the object is flexible or fragile, for example. Further, it is possible to change a grip strength depending on an application installed in the robot 10 and a situation on the spot.

It is to be noted that it is desirable that a user interface capable of specifying the grip strength of the grip section 104 and the robot 10 be configured so as to be able to cooperate via a predetermined network (e.g., the Internet or a public network) or the like. According to such a configuration, the user is able to more easily specify a desired grip strength.

4. Third Embodiment

The second embodiment has been described above. Next, a third embodiment according to the present disclosure will be described. As will be described later, according to the third embodiment, it is possible to appropriately specify the upper limit of the contact force between the grip section 104 and the object for each type of object. In the following description, only the contents differing from the second embodiment will be described, and the description of the same contents will be omitted.

4-1. Functional Configuration

FIG. 6 is a block diagram illustrating an example of a functional configuration of the robot 10 according to the third embodiment. As illustrated in FIG. 6, the robot 10 according to the third embodiment further includes an object recognizer 202 compared to the second embodiment illustrated in FIG. 5.

4-1-1. Object Recognizer 202

The object recognizer 202 may include a sensor for object recognition (e.g., an image sensor (a camera), an infrared sensor, etc.). The object recognizer 202 senses each object located around the robot 10 (e.g., within a movable range of the grip section 104) and recognizes each type of object on the basis of the sensing result.

4-1-2. Contact Force Threshold Storage 200

The contact force threshold storage 200 according to the third embodiment stores an upper limit of the contact force between the grip section 104 and the object for each type of object, which is specified in advance by the user, for example.

4-1-3. Grip Force Calculator 102

The grip force calculator 102 according to the third embodiment calculates the target grip force of the grip section 104 (or the upper limit of the force that the actuator 130 should generate) on the basis of the type of the object to be gripped recognized by the object recognizer 202 and the upper limit of the contact force of the corresponding object stored in the contact force threshold storage 200.

4-2. Effects

As described above, according to the third embodiment, it is possible to appropriately specify the upper limit of the contact force between the grip section 104 and the object for each type of object. Accordingly, the robot 10 is able to grip the object with an appropriate force corresponding to the type of the object to be gripped, and thus is able to grip the object more safely. Further, according to the third embodiment, the user does not necessarily specify the upper limit of the contact force each time, which makes it possible to reduce the number of operations.

5. Fourth Embodiment

The third embodiment has been described above. Next, a fourth embodiment according to the present disclosure will be described. As will be discussed later, according to the fourth embodiment, it is possible to appropriately specify the upper limit of the contact force between the grip section 104 and the object depending on previous grip experiences. In the following description, only the contents differing from the third embodiment will be described, and the description of the same contents will be omitted.

5-1. Functional Configuration

FIG. 7 is a block diagram illustrating an example of a functional configuration of the robot 10 according to the fourth embodiment. As illustrated in FIG. 7, the robot 10 according to the fourth embodiment further includes a contact-force-upper-limit identification section 204 compared to the third embodiment illustrated in FIG. 6.

5-1-1. Contact Force Threshold Storage 200

The contact force threshold storage 200 according to the fourth embodiment may store, in association with each other: the type of the corresponding object recognized by the object recognizer 202 at a time of previous gripping, a state of the corresponding object at the time of the gripping (e.g., whether or not the object has been broken), and a grip force of the grip section 104 at the time of the gripping.

In addition, for each type of object, an upper limit of the contact force within a range in which the object is not broken when the grip section 104 comes into contact with the object may be specified in advance on the basis of those pieces of information. In this case, the contact force threshold storage 200 may further store the upper limit of the contact force within the range in which the object is not broken for each type of object.

5-1-2. Contact-Force-Upper-Limit Identification Section 204

The contact-force-upper-limit identification section 204 identifies an upper limit of the contact force within the range in which the object to be gripped is not broken on the basis of the type of the object to be gripped recognized by the object recognizer 202 and the information stored in the contact force threshold storage 200.

5-1-3. Grip Force Calculator 102

The grip force calculator 102 according to the fourth embodiment calculates the target grip force of the grip section 104 (or the upper limit of the force that the actuator 130 should generate) on the basis of the upper limit of the contact force identified by the contact-force-upper-limit identification section 204 and the contact force at each contact point identified by the contact force identification section 110.

5-2. Effects

5-2-1. Effect 1

As described above, according to the fourth embodiment, it is possible to appropriately specify the upper limit of the contact force between the grip section 104 and the object depending on the previous gripping experiences. For example, the robot 10 is able to set the upper limit of the contact force between the grip section 104 and the object to an upper limit of the contact force when the object to be gripped was successfully gripped. Therefore, the robot 10 is able to grip each object more reliably. The robot 10 may also be able to determine grippability of an object while gripping the object. For example, in a case where it is detected that the slip does not stop even if the upper limit of the contact force of the object is applied, the robot 10 is able to determine that it is not possible or difficult to grip the object because a frictional coefficient of the object is too small.

5-2-2. Effect 2

The fourth embodiment also eliminates the necessity for human labor to determine the upper limit of the contact force. For example, it is not necessary for the user to investigate the upper limit of the contact force or collect data, making it easier to introduce the system.

6. Fifth Embodiment

The fourth embodiment has been described above. Next, a fifth embodiment according to the present disclosure will be described. As will be described later, the fifth embodiment enables the user to easily specify an upper limit of the contact force between the grip section 104 and the object, or a target value of the contact force. In the following description, only the contents differing from first embodiment will be described, and the description of the same contents will be omitted.

6-1. Functional Configuration

FIG. 8 is a block diagram illustrating an example of a functional configuration of the robot 10 according to the fifth embodiment. As illustrated in FIG. 8, the robot 10 according to the fifth embodiment further includes an input section 206 compared to the first embodiment illustrated in FIG. 2.

6-1-1. Input Section 206

The input section 206 may include an input device (e.g., a mouse, a keyboard, a touch panel, etc.), or may include an audio input device (e.g., a microphone, etc.). The input section 206 accepts various types of inputs to the robot 10.

6-1-1-1. Input Example 1

For example, prior to each time the grip section 104 grips an object, the input section 206 may accept an input of the upper limit of the contact force entered by the user. As an example, the user may enter a multiplier for a reference value of the contact force to the input section 206, or may enter any of a plurality of levels of contact force that has been prepared in advance to the input section 206. In these cases, the input information to the input section 206 is transmitted to the grip controller 100, and the grip controller 100 may determine an actual upper limit of the contact force on the basis of the input information.

6-1-1-2. Input Example 2

Alternatively, the input section 206 may accept an input of a target value of the contact force entered by the user. In this case, the grip force calculator 102 may calculate a force (a target value) that the actuator 130 should generate, such that a present contact force of the grip section 104 is the same as the target value of the contact force that has been entered.

6-2. Effects

6-2-1. Effect 1

As described above, according to the fifth embodiment, the user is able to easily specify the upper limit of the contact force between the grip section 104 and the object. For example, the user is able to specify the upper limit of the contact force each time (e.g., on a real-time basis). As a result, the robot 10 is able to immediately and robustly respond to on-the-fly situation changes and application changes. Further, the user is also able to intuitively enter the upper limit of the contact force.

6-2-2. Effect 2

Further, the fifth embodiment also enables the user to easily specify the target value of the contact force between the grip section 104 and the object. For example, the user is able to specify the target value of the contact force each time (e.g., on a real-time basis). Also, when using an application that applies a certain contact force to the object, the user is able to specify a desired contact force.

7. Sixth Embodiment

The fifth embodiment has been described above. Next, a sixth embodiment according to the present disclosure will be described. As will be described later, according to the sixth embodiment, it is possible to appropriately adjust the upper limit of the contact force depending on a state of the object at the time of being gripped. In the following description, only the contents differing from first embodiment will be described, and the description of the same contents will be omitted.

7-1. Functional Configuration

FIG. 9 is a block diagram illustrating an example of a functional configuration of the robot 10 according to the sixth embodiment. As illustrated in FIG. 9, the robot 10 according to the sixth embodiment further includes the contact-force-upper-limit identification section 204 and a grip state recognizer 208 compared to the first embodiment illustrated in FIG. 2.

7-1-1. Grip State Recognizer 208

The grip state recognizer 208 may include a sensor (e.g., an image sensor (a camera), an infrared sensor, etc.) that recognizes a grip state. The grip state recognizer 208 may sense the object that the grip section 104 is gripping, and may recognize, for example, on a real-time basis, the state of the object (e.g., whether the object has been broken, deformed, etc.), on the basis of the sensing result.

7-1-2. Contact-Force-Upper-Limit Identification Section 204

The contact-force-upper-limit identification section 204 according to the sixth embodiment calculates, for example, on a real-time basis, the upper limit of the contact force between the grip section 104 and the object on the basis of a recognition result of the state of the target object obtained by the grip state recognizer 208 and a present contact force between the grip section 104 and the object calculated by the contact force identification section 110.

7-2. Effects

As described above, according to the sixth embodiment, it is possible to appropriately adjust the upper limit of the contact force depending on the state of the object while the object is being gripped. For example, even in a case where a previously unpredictable object deformation or breakage occurs, the robot 10 is able to respond to such an event on a real-time basis by adjusting the upper limit of the contact force on a real-time basis.

It is to be noted that the robot 10 according to the sixth embodiment may recognize in advance whether or not the object (or the robot 10 itself) being gripped by the grip section 104 is likely to come into contact with an external environment (e.g., a human, an obstacle, etc.). In this case, the robot 10 may perform an adjustment on the contact force on the basis of the recognition result as an anti-slip action for avoiding a situation where the object slips down due to the contact.

8. Seventh Embodiment

The sixth embodiment has been described above. Next, a seventh embodiment according to the present disclosure will be described. As will be described later, according to the seventh embodiment, it is possible to appropriately switch between performing and not performing a slip detection process depending on a detection result of the contact between the grip section 104 and the object. In the following description, only the contents differing from first embodiment will be described, and the description of the same contents will be omitted.

8-1. Functional Configuration

FIG. 10 is a block diagram illustrating an example of a functional configuration of the robot 10 according to the seventh embodiment. As illustrated in FIG. 10, the robot 10 according to the seventh embodiment further includes a contact detector 210 compared to the first embodiment illustrated in FIG. 2.

8-1-1. Contact Detector 210

The contact detector 210 detects a presence or absence of the contact between the grip section 104 and the object on the basis of a calculation result obtained by the contact force identification section 110. The contact detector 210 may also output a contact trigger to the slip detector 112 upon detecting a start of the contact between the grip section 104 and the object.

8-1-2. Slip Detector 112

The slip detector 112 according to the seventh embodiment determines whether or not to perform a process of detecting the slip amount on the basis of the detection result obtained by the contact detector 210. For example, the slip detector 112 performs the slip detection process only while the contact between the grip section 104 and the object is detected by the contact detector 210. In other words, the slip detector 112 does not perform the slip detection process while the contact between the grip section 104 and the object is not detected by the contact detector 210. For example, the slip detector 112 may initiate the slip detection process only upon reception of the contact trigger from the slip detector 112.

8-2. Effects

As described above, according to the seventh embodiment, it is possible to appropriately switch between performing and not performing the slip detection process depending on the detection result of the contact between the grip section 104 and the object.

The slip detection process generally has a large processing load, because it is necessary to process values of the respective sensors within the entire area of the tactile sensor 106. According to seventh embodiment, since it is possible to perform the slip detection process only while the contact between the grip section 104 and the object is detected, which makes it possible to reduce the processing load while the contact between the grip section 104 and the object is not detected. As a result, it is possible to reduce memory usage and power consumption.

9. Eighth Embodiment

The seventh embodiment has been described above. Next, an eighth embodiment according to the present disclosure will be described. As will be described later, according to the eighth embodiment, it is possible to appropriately switch a type of control to be executed or a value of a control parameter before and after the contact between the grip section 104 and the object. In the following description, only the contents differing from first embodiment will be described, and the description of the same contents will be omitted.

9-1. Functional Configuration

FIG. 11 is a block diagram illustrating an example of a functional configuration of the robot 10 according to the eighth embodiment. As illustrated in FIG. 11, the robot 10 according to the eighth embodiment further includes the contact detector 210 and a body controller 212 compared to the first embodiment illustrated in FIG. 2.

9-1-1. Contact Detector 210

The contact detector 210 according to the eighth embodiment may output the contact trigger to the grip controller 100 and to the body controller 212 upon detecting the start of the contact between the grip section 104 and the object.

9-1-2. Body Controller 212

The body controller 212 controls an action of a body part (e.g., one or more joints included in a part other than the grip section 104, etc.) of the robot 10 on the basis of the detection result obtained by the contact detector 210. For example, the body controller 212 switches, depending on whether the contact between the grip section 104 and the object has been detected by the contact detector 210, both or one of: the type of control to be performed on the body part of the robot 10; and the control parameter related to the body part of the robot 10. Here, such a type of control may include, for example, a position control, a force control, or the like. Further, such a control parameter may include, for example, a mechanical impedance, a control gain, a position, a force, a speed, a torque, or another command value. In addition, the control parameter may further include an upper limit or a lower limit of these parameters.

For example, the body controller 212 only performs the position control on the body part of the robot 10 until the contact between the grip section 104 and the object is detected by the contact detector 210. After the contact between the grip section 104 and the object is detected by the contact detector 210, the body controller 212 may switch the type of control to perform the force control instead of the position control on the body part of the robot 10.

Alternatively, the body controller 212 does not change the value of the control parameter related to the body part of the robot 10 until the contact between the grip section 104 and the object is detected by the contact detector 210. After the contact between the grip section 104 and the object is detected by the contact detector 210, the body controller 212 may switch the value of the control parameter related to the body part of the robot 10, for example, depending on the detection result. For example, when the contact between the grip section 104 and the object is detected, the body controller 212 may reduce the control gain with respect to the body part of the robot 10 such that the body part of the robot 10 moves while sudden changes are suppressed. Alternatively, when the touch is detected, the body controller 212 may change a mechanical impedance set value of the body part of the robot 10 such that a motion of the body part of the robot 10 becomes more flexible.

Alternatively, the body controller 212 may not necessarily change the type of control on the body part of the robot 10 and maintain the type of control of the force control, and may change a mechanical impedance setting of the body part of the robot 10 (an example of the control parameter) in the timing of contact between the grip section 104 and the object.

9-1-3. Grip Controller 100

The grip controller 100 according to the eighth embodiment controls an action of the grip section 104 on the basis of the detection result obtained by the contact detector 210. For example, the grip controller 100 switches, depending on whether the contact between the grip section 104 and the object has been detected by the contact detector 210, both or one of: the type of control to be performed on the grip section 104; and a control parameter related to the grip section 104. Specific contents of the type of control and the control parameter may be similar to the contents described above (in relation to the body controller 212).

For example, the grip controller 100 only performs the position control on the grip section 104 until the contact between the grip section 104 and the object is detected by the contact detector 210. After the contact between the grip section 104 and the object is detected by the contact detector 210, the grip controller 100 may switch the type of control to perform the force control instead of the position control on the grip section 104.

9-2. Effects

As described above, according to the eighth embodiment, it is possible to appropriately switch the type of control to be executed or the value of the control parameter before and after the contact between the grip section 104 and the object.

10. Ninth Embodiment

The eighth embodiment has been described above. Next, a ninth embodiment according to the present disclosure will be described. As will be described later, according to the ninth embodiment, it is possible to detect the slip amount of the object with respect to the grip section 104 using not only the sensing result obtained by the tactile sensor 106 but also the sensing result obtained by the force sensor 108 simultaneously. In the following description, only the contents differing from first embodiment will be described, and the description of the same contents will be omitted.

10-1. Functional Configuration

FIG. 12 is a block diagram illustrating an example of a functional configuration of the robot 10 according to the ninth embodiment. As illustrated in FIG. 12, the ninth embodiment only differs from the first embodiment illustrated in FIG. 2 in that the force sensor 108 is coupled to the slip detector 112.

The slip detector 112 according to the ninth embodiment detects the slip amount of the object while the grip section 104 and the object are in contact with each other, on the basis of the contact force at the individual contact point calculated by the contact force identification section 110, the sensing result obtained by the tactile sensor 106, and the sensing result obtained by the force sensor 108.

11. Modification Example

Preferred embodiments of the present disclosure have been described above in detail with reference to the accompanying drawings, but the technical scope of the present disclosure is not limited to such embodiments. It is apparent that a person having ordinary skill in the art of the present disclosure can arrive at various alterations and modifications within the scope of the technical idea described in the appended claims, and it is understood that such alterations and modifications naturally fall within the technical scope of the present disclosure.

11-1. Modification Example 1

For example, the body controller 212 according to the eighth embodiment is not limited to the example of being included in the robot 10 according to the eighth embodiment. The robot 10 according to any other embodiment may also include the body controller 212.

11-2. Modification Example 2

As another modification example, in the embodiments described above, an example in which the contact section according to the present disclosure serves as the grip section 104 has been described, but the present disclosure is not limited to such an example. For example, the contact section is not necessarily limited to an example having a configuration that makes it possible to grip an object, and may have a structure that makes it possible to come into contact with an object. An example is given in which the robot 10 may be able to press or pull the contact section against the object.

For example, the contact section may be a surface of any part (e.g., a torso part, an arm part, or a leg part) included in the robot 10.

11-3. Modification Example 3

As another modification example, in the embodiments described above, an example in which the control device according to the present disclosure is the robot 10 has been described, but the present disclosure is not limited to such an example, and the control device may be a device other than the robot 10. For example, the control device may be a server, a general-purpose PC (Personal Computer), a tablet terminal, a game machine, a mobile phone such as a smart phone, a wearable device such as an HMD (Head Mounted Display) or a smart watch, an in-vehicle device (such as a car navigation device), or another robot (such as a humanoid robot or a drone) or the like.

In this case, the control device may control the action of the robot 10 via the predetermined network described above. For example, the control device may first receive the sensing result obtained by the tactile sensor 106 and the sensing result obtained by the force sensor 108 from the robot 10, and calculate, on the basis of these sensing results, the contact force at each contact point of when the grip section 104 and the object are in contact with each other.

11-4. Modification Example 4

Further, the steps included in the process described above does not necessarily have to be processed in the stated order. For example, the steps may be processed in different order as appropriate. Also, the steps may be processed partially in parallel or individually instead of being processed in time series. Further, some of the steps described may be omitted or other steps may be added.

Further, it is also possible to create a computer program for causing hardware such as the CPU, the ROM, and the RAM to exhibit substantially the same functions as those of respective components (e.g., the contact force identification section 110, the slip detector 112, the grip controller 100, etc.) of the robot 10 described above. Further, there is also provided a storage medium having the computer program stored therein.

Further, the effects described herein are merely illustrative and exemplary, and not limiting. That is, the technique according to the present disclosure can exert other effects that are apparent to those skilled in the art from the description herein, in addition to the above-described effects or in place of the above-described effects.

It is to be noted that the following configurations also belong to the technical scope of the present disclosure.

(1)

A control device including a grip controller that controls a grip force related to a contact section depending on a contact force of when the contact section and an object come into contact with each other, the contact force being based on a sensing result obtained by a tactile sensor disposed at the contact section and a sensing result obtained by a force sensor disposed at the contact section.

(2)

The control device according to (1), in which the contact section is a grip section, and the grip controller controls a grip force of the grip section depending on contact forces at respective individual contact points, the contact forces at the respective individual contact points being calculated on a basis of the sensing result obtained by the force sensor and information related to the individual contact points of when the grip section and the object come into contact with each other at one or more points, the information related to the individual contact points being identified on a basis of the sensing result obtained by the tactile sensor.

(3)

The control device according to (2), in which the information related to the individual contact points includes a total number of the individual contact points and information indicating a position relationship of the individual contact points.

(4)

The control device according to (3), in which the information related to the individual contact points further includes a contact strength ratio between the individual contact points.

(5)

The control device according to (4), in which the information indicating the position relationship of the individual contact points includes pieces of position information of the respective individual contact points within the grip section.

(6)

The control device according to (4) or (5), in which the grip controller controls the grip force of the grip section depending on contact forces at the respective individual contact points, the contact forces at the respective individual contact points being calculated on a basis of the information related to the individual contact points and a resultant force of contact forces between the grip section and the object, the resultant force being identified on a basis of the sensing result obtained by the force sensor.

(7)

The control device according to (4) or (5), in which the grip section is coupled to an actuator or the grip section includes an actuator, and the grip controller controls the grip force of the grip section depending on contact forces at the respective individual contact points of when the grip section and the object are in contact with each other at one or more points, the contact forces being calculated on a basis of the information related to the individual contact points and a generation force of the actuator identified on a basis of the sensing result obtained by the force sensor.

(8)

The control device according to any one of (4) to (7), further including a contact force calculator that calculates contact forces at the respective individual contact points on a basis of the information related to the individual contact points and the sensing result obtained by the force sensor.

(9)

The control device according to (8), further including a slip detector that detect a slip amount of the object with respect to the grip section on a basis of the sensing result obtained by the tactile sensor.

(10)

The control device according to (9), in which the slip detector detects the slip amount of the object with respect to the grip section further on a basis of the contact forces at the respective individual contact points calculated by the contact force calculator.

(11)

The control device according to (10), in which the slip detector detects the slip amount of the object with respect to the grip section further on a basis of the sensing result obtained by the force sensor.

(12)

The control device according to (10) or (11), in which the slip detector further determines whether or not to detect the slip amount of the object with respect to the grip section, on a basis of whether or not a contact between the grip section and the object has been detected.

(13)

The control device according to any one of (9) to (12), in which the grip controller controls the grip force of the grip section depending on the contact forces at the respective individual contact points calculated by the contact force calculator and the slip amount detected by the slip detector.

(14)

The control device according to (13), in which the grip controller controls the grip force of the grip section further depending on an upper limit of the contact force of when the contact section and the object come into contact with each other, the upper limit being specified by a user.

(15)

The control device according to (13) or (14), in which the grip controller controls the grip force of the grip section further depending on a target value of a contact force of the grip section with respect to the object, the target value being specified by a user.

(16)

The control device according to any one of (13) to (15), in which the grip controller controls the grip force of the grip section further depending on information indicating a relationship between a state of the object and a grip force of the grip section of when the grip section gripped the object in the past.

(17)

The control device according to any one of (13) to (16), in which the grip controller controls the grip force of the grip section further depending on a recognition result of a state of the object while the grip section is in contact with the object.

(18)

The control device according to any one of (13) to (17), in which the grip controller further switches a type of control to be performed on the grip section or a control parameter related to the grip section, depending on whether or not a contact between the grip section and the object has been detected.

(19)

A control method including controlling, by a processor, a grip force related to a contact section depending on a contact force of when the contact section and an object come into contact with each other, the contact force being based on a sensing result obtained by a tactile sensor disposed at the contact section and a sensing result obtained by a force sensor disposed at the contact section.

(20)

A program for causing a computer to function as a grip controller that controls a grip force related to a contact section depending on a contact force of when the contact section and an object come into contact with each other, the contact force being based on a sensing result obtained by a tactile sensor disposed at the contact section and a sensing result obtained by a force sensor disposed at the contact section.

REFERENCE SIGNS LIST 10 robot
100 grip controller
102 grip force calculator
104 grip section
106 tactile sensor
108 force sensor
110 contact force identification section
112 slip detector
130 actuator
150 number-of-contact-portions calculator
152 contact position calculator
154 contact strength calculator
156 contact force calculator
200 contact force threshold storage
202 object recognizer
204 contact-force-upper-limit identification section
206 input section
208 grip state recognizer
210 contact detector
212 body controller

The invention claimed is:

1. A control device comprising:
a grip controller configured to control a contact force at each contact point of a plurality of contact points when a contact section and an object come into contact with each other, the contact force being based on a sensing result obtained by a tactile sensor disposed at the contact section and a sensing result obtained by a force sensor disposed at the contact section,
wherein the sensing result obtained by the tactile sensor is used to determine a number of the plurality of contact points on the tactile sensor and a relative position from a predetermined reference position of each contact point of the plurality of contact points on the tactile sensor, which indicates a positional relationship between the plurality of contact points,
wherein the contact force at each contact point is controlled according to the number of the plurality of contact points, the relative position of each contact point, and a contact force strength ratio between individual contact points of the plurality of contact points,
wherein the contact force strength ratio is calculated for each individual contact point with respect to each other individual contact point of the plurality of contact points, and
wherein the grip controller is implemented via at least one processor.

2. The control device according to claim 1,
wherein the contact section is a grip section,
wherein the grip controller controls a grip force of the grip section depending on respective contact forces at respective individual contact points,
wherein the respective contact forces at the respective individual contact points are calculated on a basis of the sensing result obtained by the force sensor and information related to the individual contact points of when the grip section and the object come into contact with each other at the plurality of contact points, and
wherein the information related to the individual contact points is identified on a basis of the sensing result obtained by the tactile sensor.

3. The control device according to claim 2,
wherein information indicating the positional relationship of the individual contact points among the plurality of contact points includes pieces of position information of the respective individual contact points within the grip section.

4. The control device according to claim 2,
wherein the grip controller controls the grip force of the grip section depending on contact forces at the respective individual contact points,
wherein the respective contact forces at the respective individual contact points are calculated on a basis of the information related to the individual contact points and a resultant force calculated as a sum of contact forces between the grip section and the object, and
wherein the resultant force is identified on a basis of the sensing result obtained by the force sensor.

5. The control device according to claim 2,
wherein the grip section is coupled to an actuator or the grip section includes an actuator,
wherein the grip controller controls the grip force of the grip section depending on contact forces at the respective individual contact points of when the grip section and the object are in contact with each other at one or more points, and
wherein the respective contact forces are calculated on a basis of the information related to the respective individual contact points and a generation force of the actuator identified on a basis of the sensing result obtained by the force sensor.

6. The control device according to claim 2, further comprising:
a contact force calculator configured to calculate the respective contact forces at the respective individual contact points on a basis of the information related to the individual contact points and the sensing result obtained by the force sensor,
wherein the contact force calculator is implemented via at least one processor.

7. The control device according to claim 6, further comprising:
a slip detector configured to detect a slip amount of the object with respect to the grip section on a basis of the sensing result obtained by the tactile sensor,
wherein the slip detector is implemented via at least one processor.

8. The control device according to claim 7,
wherein the slip detector detects the slip amount of the object with respect to the grip section further on a basis of the respective contact forces at the respective individual contact points calculated by the contact force calculator.

9. The control device according to claim 8,
wherein the slip detector detects the slip amount of the object with respect to the grip section further on a basis of the sensing result obtained by the force sensor.

10. The control device according to claim 8,
wherein the slip detector further determines whether or not to detect the slip amount of the object with respect to the grip section, on a basis of whether or not a contact between the grip section and the object has been detected.

11. The control device according to claim 7,
wherein the grip controller controls the grip force of the grip section depending on the respective contact forces at the respective individual contact points calculated by the contact force calculator and the slip amount detected by the slip detector.

12. The control device according to claim 11,
wherein the grip controller controls the grip force of the grip section further depending on an upper limit of the contact force when the contact section and the object come into contact with each other, the upper limit being specified by a user.

13. The control device according to claim 11,
wherein the grip controller controls the grip force of the grip section further depending on a target value of a contact force of the grip section with respect to the object, the target value being specified by a user.

14. The control device according to claim 11,
wherein the grip controller controls the grip force of the grip section further depending on information indicating a relationship between a state of the object and a grip force of the grip section of when the grip section gripped the object in the past.

15. The control device according to claim 11,
wherein the grip controller controls the grip force of the grip section further depending on a recognition result of a state of the object while the grip section is in contact with the object.

16. The control device according to claim 11,
wherein the grip controller further switches a type of control to be performed on the grip section or a control parameter related to the grip section, depending on whether or not a contact between the grip section and the object has been detected.

17. The control device according to claim 1,
wherein the sensing result obtained by the tactile sensor is used to determine the number of the plurality of contact points prior to determining the relative position of each contact point.

18. The control device according to claim 1,
wherein the sensing result obtained by the tactile sensor is used to determine the contact force strength ratio.

19. The control device according to claim 1,
wherein the contact force strength ratio is calculated with respect to a shear force at each individual contact point.

20. A control method comprising:
controlling, by a processor, a contact force at each contact point of a plurality of contact points when a contact section and an object come into contact with each other, the contact force being based on a sensing result obtained by a tactile sensor disposed at the contact section and a sensing result obtained by a force sensor disposed at the contact section,
wherein the sensing result obtained by the tactile sensor is used to determine a number of the plurality of contact points on the tactile sensor and a relative position from a predetermined reference position of each contact point of the plurality of contact points on the tactile sensor, which indicates a positional relationship between the plurality of contact points,
wherein the contact force at each contact point is controlled according to the number of the plurality of contact points, the relative position of each contact point, and a contact force strength ratio between individual contact points of the plurality of contact points, and
wherein the contact force strength ratio is calculated for each individual contact point with respect to each other individual contact point of the plurality of contact points.

21. A non-transitory computer-readable storage medium having embodied thereon a program, which executed by a computer causes the computer to execute a method, the method comprising:

controlling a contact force at each contact point of a plurality of contact points when a contact section and an object come into contact with each other, the contact force being based on a sensing result obtained by a tactile sensor disposed at the contact section and a sensing result obtained by a force sensor disposed at the contact section, wherein the sensing result obtained by the tactile sensor is used to determine a number of the plurality of contact points on the tactile sensor and a relative position from a predetermined reference position of each contact point of the plurality of contact points on the tactile sensor, which indicates a positional relationship between the plurality of contact points, wherein the contact force at each contact point is controlled according to the number of the plurality of contact points, the relative position of each contact point, and a contact force strength ratio between individual contact points of the plurality of contact points, and wherein the contact force strength ratio is calculated for each individual contact point with respect to each other individual contact point of the plurality of contact points.

* * * * *